US012381995B2

(12) United States Patent
Holzer et al.

(10) Patent No.: US 12,381,995 B2
(45) Date of Patent: *Aug. 5, 2025

(54) SCENE-AWARE SELECTION OF FILTERS AND EFFECTS FOR VISUAL DIGITAL MEDIA CONTENT

(71) Applicant: Fyusion, Inc., San Francisco, CA (US)

(72) Inventors: Stefan Johannes Josef Holzer, San Mateo, CA (US); Matteo Munaro, San Francisco, CA (US); Abhishek Kar, Berkeley, CA (US); Alexander Jay Bruen Trevor, San Francisco, CA (US); Krunal Ketan Chande, San Francisco, CA (US); Michelle Jung-Ah Ho, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,975

(22) Filed: Apr. 14, 2024

(65) Prior Publication Data
US 2024/0267481 A1    Aug. 8, 2024

Related U.S. Application Data

(63) Continuation of application No. 15/427,030, filed on Feb. 7, 2017, now abandoned.

(51) Int. Cl.
*H04N 5/262* (2006.01)
*G06V 10/22* (2022.01)
(Continued)

(52) U.S. Cl.
CPC .......... *H04N 5/2621* (2013.01); *G06V 10/22* (2022.01); *G06V 20/10* (2022.01); *G06V 20/40* (2022.01);
(Continued)

(58) Field of Classification Search
CPC .. H04N 5/2621; H04N 23/683; H04N 23/611; H04N 23/62; G06V 20/40; G06V 20/10; G06V 10/22
See application file for complete search history.

(56) References Cited

U.S. PATENT DOCUMENTS 2,534,821 A    12/1950    Richard
5,495,576 A    2/1996    Ritchey
(Continued)

FOREIGN PATENT DOCUMENTS

CN    104462365 A    3/2015
CN    105849781 A    8/2016
(Continued)

OTHER PUBLICATIONS

Zhang, Zhengyou, et al., A robust technique for matching two uncalibrated images through the recovery of the unknown epipolar geometry, Elsevier, Artificial Intelligence 78, 1995, 87-119 pgs.
(Continued)

*Primary Examiner* — Oschta I Montoya
(74) *Attorney, Agent, or Firm* — Kwan & Olynick LLP

(57) ABSTRACT

Provided are mechanisms and processes for scene-aware selection of filters and effects for visual digital media content. In one example, a digital media item is analyzed with a processor to identify one or more characteristics associated with the digital media item, where the characteristics include a physical object represented in the digital media item. Based on the identified characteristics, a digital media modification is selected from a plurality of digital media modifications for application to the digital media item. The digital media modification may then be provided for presentation in a user interface for selection by a user.

20 Claims, 10 Drawing Sheets

(51) Int. Cl.
   *G06V 20/10*      (2022.01)
   *G06V 20/40*      (2022.01)
   *H04N 23/611*     (2023.01)
   *H04N 23/62*      (2023.01)
   *H04N 23/68*      (2023.01)

(52) U.S. Cl.
   CPC .......... *H04N 23/611* (2023.01); *H04N 23/62*
   (2023.01); *H04N 23/683* (2023.01)

(56) References Cited

U.S. PATENT DOCUMENTS

| | | | |
|---|---|---|---|
| 5,557,684 A | 9/1996 | Wang |
| 5,613,048 A | 3/1997 | Chen |
| 5,613,056 A | 3/1997 | Gasper |
| 5,694,533 A | 12/1997 | Richards |
| 5,706,417 A | 1/1998 | Adelson |
| 5,847,714 A | 12/1998 | Naqvi |
| 5,850,352 A | 12/1998 | Moezzi |
| 5,926,190 A | 7/1999 | Turkowski |
| 6,031,564 A | 2/2000 | Ma |
| 6,080,063 A | 6/2000 | Khosla |
| 6,185,343 B1 | 2/2001 | Ikeda |
| 6,252,974 B1 | 6/2001 | Martens |
| 6,266,068 B1 | 7/2001 | Kang |
| 6,281,903 B1 | 8/2001 | Martin |
| 6,327,381 B1 | 12/2001 | Rogina |
| 6,385,245 B1 | 5/2002 | De Haan |
| 6,504,569 B1 | 1/2003 | Jasinschi |
| 6,522,787 B1 | 2/2003 | Kumar |
| 6,778,207 B1 | 8/2004 | Lee |
| 6,814,889 B1 | 11/2004 | James |
| 6,975,756 B1 | 12/2005 | Slabaugh |
| 7,167,180 B1 | 1/2007 | Shibolet |
| 7,593,000 B1 | 9/2009 | Chin |
| 7,631,261 B2 | 12/2009 | Williams |
| 7,631,277 B1 | 12/2009 | Nie |
| 8,078,004 B2 | 12/2011 | Kang |
| 8,094,928 B2 | 1/2012 | Graepel |
| 8,160,391 B1 | 4/2012 | Zhu |
| 8,244,069 B1 | 8/2012 | Bourdev |
| 8,401,276 B1 | 3/2013 | Choe |
| 8,503,826 B2 | 8/2013 | Klimenko |
| 8,504,842 B1 | 8/2013 | Meacham |
| 8,515,982 B1 | 8/2013 | Hickman |
| 8,589,069 B1 | 11/2013 | Lehman |
| 8,682,097 B2 | 3/2014 | Steinberg |
| 8,803,912 B1 | 8/2014 | Fouts |
| 8,817,071 B2 | 8/2014 | Wang |
| 8,819,525 B1 | 8/2014 | Holmer |
| 8,866,841 B1 | 10/2014 | Distler |
| 8,942,917 B2 | 1/2015 | Chrysanthakopoulos |
| 8,947,452 B1 | 2/2015 | Ballagh |
| 8,947,455 B2 | 2/2015 | Friesen |
| 8,963,855 B2 | 2/2015 | Chen |
| 8,966,356 B1 | 2/2015 | Hickman |
| 9,024,970 B2 | 5/2015 | Lynch |
| 9,027,117 B2 | 5/2015 | Wilairat |
| 9,043,222 B1 | 5/2015 | Kerr |
| 9,070,402 B2 | 6/2015 | Burtnyk |
| 9,094,670 B1 | 7/2015 | Furio |
| 9,129,179 B1 | 9/2015 | Wong |
| 9,317,881 B1 | 4/2016 | Ledterman |
| 9,325,899 B1 | 4/2016 | Chou |
| 9,367,951 B1 | 6/2016 | Gray |
| 9,390,250 B2 | 7/2016 | Kim |
| 9,400,595 B2 | 7/2016 | Li |
| 9,407,816 B1 | 8/2016 | Sehn |
| 9,412,203 B1 | 8/2016 | Garcia, III |
| 9,472,161 B1 | 10/2016 | Ho |
| 9,621,768 B1 | 4/2017 | Lyon |
| 9,704,257 B1 | 7/2017 | Tuzel |
| 9,734,586 B2 | 8/2017 | Luo |
| 9,865,033 B1 | 1/2018 | Jafarzadeh |
| 9,865,058 B2 | 1/2018 | Mullins |
| 9,865,069 B1 | 1/2018 | Saporta |
| 9,886,771 B1 | 2/2018 | Chen |
| 9,898,742 B2 | 2/2018 | Higgins |
| 9,904,056 B2 | 2/2018 | Raghoebardajal |
| 9,910,505 B2 | 3/2018 | Park |
| 9,928,544 B1 | 3/2018 | Hasan |
| 9,940,541 B2 | 4/2018 | Holzer |
| 9,968,257 B1 | 5/2018 | Burt |
| 9,998,663 B1 | 6/2018 | François |
| 10,008,027 B1 | 6/2018 | Baker |
| 10,055,882 B2 | 8/2018 | Marin |
| 10,104,300 B2 * | 10/2018 | Guo ..................... H04N 23/63 |
| 10,147,211 B2 | 12/2018 | Holzer |
| 10,152,059 B2 * | 12/2018 | Banerjee ............... H04N 23/68 |
| 10,157,333 B1 | 12/2018 | Wang |
| 10,176,592 B2 | 1/2019 | Holzer |
| 10,176,636 B1 | 1/2019 | Neustein |
| 10,204,448 B2 | 2/2019 | Hazeghi |
| 10,222,932 B2 | 3/2019 | Holzer |
| 10,242,474 B2 | 3/2019 | Holzer |
| 10,262,426 B2 | 4/2019 | Holzer |
| 10,275,935 B2 | 4/2019 | Holzer |
| 10,284,794 B1 | 5/2019 | Francois |
| 10,306,203 B1 | 5/2019 | Goyal |
| 10,360,601 B1 | 7/2019 | Adegan |
| 10,373,260 B1 | 8/2019 | Haller, Jr. |
| 10,382,739 B1 | 8/2019 | Rusu |
| 10,430,995 B2 | 10/2019 | Holzer |
| 10,574,974 B2 | 2/2020 | Arora |
| 10,592,199 B2 | 3/2020 | Rakshit |
| 10,657,647 B1 | 5/2020 | Chen |
| 10,668,965 B2 | 6/2020 | Czinger |
| 10,719,939 B2 | 7/2020 | Holzer |
| 10,725,609 B2 | 7/2020 | Holzer |
| 10,726,560 B2 | 7/2020 | Holzer |
| 10,748,313 B2 | 8/2020 | Holzer |
| 10,750,161 B2 | 8/2020 | Holzer |
| 10,818,029 B2 | 10/2020 | Holzer |
| 10,846,913 B2 | 11/2020 | Holzer |
| 10,852,902 B2 | 12/2020 | Holzer |
| 11,006,095 B2 | 5/2021 | Holzer |
| 11,055,534 B2 | 7/2021 | Beall |
| 11,138,432 B2 | 10/2021 | Holzer |
| 11,438,565 B2 | 9/2022 | Trevor |
| 2001/0014172 A1 | 8/2001 | Baba |
| 2001/0046262 A1 | 11/2001 | Freda |
| 2002/0024517 A1 | 2/2002 | Yamaguchi |
| 2002/0094125 A1 | 7/2002 | Guo |
| 2002/0190991 A1 | 12/2002 | Efran |
| 2003/0065668 A1 | 4/2003 | Sowizral |
| 2003/0086002 A1 | 5/2003 | Cahill |
| 2003/0120472 A1 | 6/2003 | Lind |
| 2003/0137506 A1 | 7/2003 | Efran |
| 2003/0137517 A1 | 7/2003 | Kondo |
| 2003/0185456 A1 | 10/2003 | Sato |
| 2003/0231179 A1 | 12/2003 | Suzuki |
| 2004/0085335 A1 | 5/2004 | Burlnyk |
| 2004/0104935 A1 | 6/2004 | Williamson |
| 2004/0141014 A1 | 7/2004 | Kamiwada |
| 2004/0184013 A1 | 9/2004 | Raskar |
| 2004/0222987 A1 | 11/2004 | Chang |
| 2004/0239699 A1 | 12/2004 | Uyttendaele |
| 2005/0018045 A1 | 1/2005 | Thomas |
| 2005/0041842 A1 | 2/2005 | Frakes |
| 2005/0046645 A1 | 3/2005 | Breton |
| 2005/0119550 A1 | 6/2005 | Serra |
| 2005/0151759 A1 | 7/2005 | Gonzalez-Banos |
| 2005/0186548 A1 | 8/2005 | Tomlinson |
| 2005/0195216 A1 | 9/2005 | Kramer |
| 2005/0219264 A1 | 10/2005 | Shum |
| 2005/0226502 A1 | 10/2005 | Cohen |
| 2005/0232467 A1 | 10/2005 | Mohri |
| 2005/0232510 A1 | 10/2005 | Blake |
| 2005/0253877 A1 | 11/2005 | Thompson |
| 2005/0283075 A1 | 12/2005 | Ma |
| 2005/0285874 A1 | 12/2005 | Zitnick, III |
| 2006/0028552 A1 | 2/2006 | Aggarwal |
| 2006/0087498 A1 | 4/2006 | Evemy |
| 2006/0188147 A1 | 8/2006 | Rai |

(56) References Cited

U.S. PATENT DOCUMENTS

| | | |
|---|---|---|
| 2006/0193535 A1 | 8/2006 | Mishima |
| 2006/0250505 A1 | 11/2006 | Gennetten |
| 2006/0256109 A1 | 11/2006 | Acker |
| 2007/0008312 A1 | 1/2007 | Zhou |
| 2007/0058880 A1 | 3/2007 | Lienard |
| 2007/0064802 A1 | 3/2007 | Paniconi |
| 2007/0070069 A1 | 3/2007 | Samarasekera |
| 2007/0110338 A1 | 5/2007 | Snavely |
| 2007/0118801 A1 | 5/2007 | Harshbarger |
| 2007/0126928 A1 | 6/2007 | Klompnhouwer |
| 2007/0159487 A1 | 7/2007 | Felt |
| 2007/0237420 A1 | 10/2007 | Steedly |
| 2007/0237422 A1 | 10/2007 | Zhou |
| 2007/0252804 A1 | 11/2007 | Engel |
| 2007/0269054 A1 | 11/2007 | Takagi |
| 2008/0009734 A1 | 1/2008 | Houle |
| 2008/0025588 A1 | 1/2008 | Zhang |
| 2008/0033641 A1 | 2/2008 | Medalia |
| 2008/0106593 A1 | 5/2008 | Arfvidsson |
| 2008/0151106 A1 | 6/2008 | Verburgh |
| 2008/0152258 A1 | 6/2008 | Tulkki |
| 2008/0198159 A1 | 8/2008 | Liu |
| 2008/0201734 A1 | 8/2008 | Lyon |
| 2008/0225132 A1 | 9/2008 | Inaguma |
| 2008/0232716 A1 | 9/2008 | Plagne |
| 2008/0246759 A1 | 10/2008 | Summers |
| 2008/0266142 A1 | 10/2008 | Sula |
| 2008/0278569 A1 | 11/2008 | Rotem |
| 2008/0313014 A1 | 12/2008 | Fell |
| 2009/0003725 A1 | 1/2009 | Merkel |
| 2009/0046160 A1 | 2/2009 | Hayashi |
| 2009/0077161 A1 | 3/2009 | Hamilton, II |
| 2009/0087029 A1 | 4/2009 | Coleman |
| 2009/0116732 A1 | 5/2009 | Zhou |
| 2009/0141130 A1 | 6/2009 | Ortiz |
| 2009/0144173 A1 | 6/2009 | Mo |
| 2009/0153549 A1 | 6/2009 | Lynch |
| 2009/0160934 A1 | 6/2009 | Hendrickson |
| 2009/0163185 A1 | 6/2009 | Lim |
| 2009/0174709 A1 | 7/2009 | Kozlak |
| 2009/0208062 A1 | 8/2009 | Sorek |
| 2009/0259946 A1 | 10/2009 | Dawson |
| 2009/0262074 A1 | 10/2009 | Nasiri |
| 2009/0263045 A1 | 10/2009 | Szeliski |
| 2009/0274391 A1 | 11/2009 | Arcas |
| 2009/0276805 A1 | 11/2009 | Andrews, II |
| 2009/0282335 A1 | 11/2009 | Alexandersson |
| 2009/0303343 A1 | 12/2009 | Drimbarean |
| 2010/0007715 A1 | 1/2010 | Lai |
| 2010/0017181 A1 | 1/2010 | Mouton |
| 2010/0026788 A1 | 2/2010 | Ishikawa |
| 2010/0033553 A1 | 2/2010 | Levy |
| 2010/0060793 A1 | 3/2010 | Oz |
| 2010/0079667 A1 | 4/2010 | Engin |
| 2010/0098258 A1 | 4/2010 | Thorn |
| 2010/0100492 A1 | 4/2010 | Law |
| 2010/0110069 A1 | 5/2010 | Yuan |
| 2010/0111444 A1 | 5/2010 | Coffman |
| 2010/0164990 A1 | 7/2010 | Van Doorn |
| 2010/0171691 A1 | 7/2010 | Cook |
| 2010/0188584 A1 | 7/2010 | Liu |
| 2010/0215251 A1 | 8/2010 | Klein Gunnewiek |
| 2010/0225743 A1 | 9/2010 | Florencio |
| 2010/0231593 A1 | 9/2010 | Zhou |
| 2010/0259595 A1 | 10/2010 | Trimeche |
| 2010/0265164 A1 | 10/2010 | Okuno |
| 2010/0266172 A1 | 10/2010 | Shlomi |
| 2010/0305857 A1 | 12/2010 | Byrne |
| 2010/0315412 A1 | 12/2010 | Sinha |
| 2010/0329542 A1 | 12/2010 | Ramalingam |
| 2011/0007072 A1 | 1/2011 | Khan |
| 2011/0033170 A1 | 2/2011 | Ikeda |
| 2011/0034103 A1 | 2/2011 | Fong |
| 2011/0040539 A1 | 2/2011 | Szymczyk |
| 2011/0043604 A1 | 2/2011 | Peleg |
| 2011/0064388 A1 | 3/2011 | Brown |
| 2011/0074926 A1 | 3/2011 | Khan |
| 2011/0090344 A1 | 4/2011 | Gefen |
| 2011/0105192 A1 | 5/2011 | Jung |
| 2011/0109618 A1 | 5/2011 | Nowak |
| 2011/0109726 A1 | 5/2011 | Hwang |
| 2011/0115886 A1 | 5/2011 | Nguyen |
| 2011/0141141 A1 | 6/2011 | Kankainen |
| 2011/0141227 A1 | 6/2011 | Bigioi |
| 2011/0142289 A1 | 6/2011 | Barenbrug |
| 2011/0142343 A1 | 6/2011 | Kim |
| 2011/0170789 A1 | 7/2011 | Amon |
| 2011/0173565 A1 | 7/2011 | Ofek |
| 2011/0179373 A1 | 7/2011 | Moore |
| 2011/0193941 A1 | 8/2011 | Inaba |
| 2011/0214072 A1 | 9/2011 | Lindemann |
| 2011/0234750 A1 | 9/2011 | Lai |
| 2011/0248987 A1 | 10/2011 | Mitchell |
| 2011/0254835 A1 | 10/2011 | Segal |
| 2011/0261050 A1 | 10/2011 | Smolic |
| 2011/0288858 A1 | 11/2011 | Gay |
| 2011/0313653 A1 | 12/2011 | Lindner |
| 2011/0316963 A1 | 12/2011 | Li |
| 2012/0007713 A1 | 1/2012 | Nasiri |
| 2012/0013711 A1 | 1/2012 | Tamir |
| 2012/0017147 A1 | 1/2012 | Mark |
| 2012/0019557 A1 | 1/2012 | Aronsson |
| 2012/0028706 A1 | 2/2012 | Raitt |
| 2012/0041722 A1 | 2/2012 | Quan |
| 2012/0057006 A1 | 3/2012 | Joseph |
| 2012/0062756 A1 | 3/2012 | Tian |
| 2012/0075411 A1 | 3/2012 | Matsumoto |
| 2012/0092348 A1 | 4/2012 | McCutchen |
| 2012/0095323 A1 | 4/2012 | Eskandari |
| 2012/0099804 A1 | 4/2012 | Aguilera |
| 2012/0127172 A1 | 5/2012 | Wu |
| 2012/0127270 A1 | 5/2012 | Zhang |
| 2012/0139918 A1 | 6/2012 | Michail |
| 2012/0147224 A1 | 6/2012 | Takayama |
| 2012/0148162 A1 | 6/2012 | Zhang |
| 2012/0162223 A1 | 6/2012 | Hirai |
| 2012/0162253 A1 | 6/2012 | Collins |
| 2012/0167146 A1 | 6/2012 | Incorvia |
| 2012/0198317 A1 | 8/2012 | Eppolito |
| 2012/0207308 A1 | 8/2012 | Sung |
| 2012/0212579 A1 | 8/2012 | Per |
| 2012/0236201 A1 | 9/2012 | Larsen |
| 2012/0240035 A1 | 9/2012 | Gaucas |
| 2012/0242798 A1 | 9/2012 | McArdle |
| 2012/0257025 A1 | 10/2012 | Kim |
| 2012/0257065 A1 | 10/2012 | Velarde |
| 2012/0258436 A1 | 10/2012 | Lee |
| 2012/0262580 A1 | 10/2012 | Huebner |
| 2012/0287123 A1 | 11/2012 | Starner |
| 2012/0293632 A1 | 11/2012 | Yukich |
| 2012/0294549 A1 | 11/2012 | Doepke |
| 2012/0300019 A1 | 11/2012 | Yang |
| 2012/0301044 A1 | 11/2012 | Nakada |
| 2012/0314027 A1 | 12/2012 | Tian |
| 2012/0314040 A1 | 12/2012 | Kopf |
| 2012/0314899 A1 | 12/2012 | Cohen |
| 2012/0329527 A1 | 12/2012 | Kang |
| 2012/0330659 A1 | 12/2012 | Nakadai |
| 2013/0002649 A1 | 1/2013 | Wu |
| 2013/0016102 A1 | 1/2013 | Look |
| 2013/0016897 A1 | 1/2013 | Cho |
| 2013/0018881 A1 | 1/2013 | Bhatt |
| 2013/0044191 A1 | 2/2013 | Matsumoto |
| 2013/0050573 A1 | 2/2013 | Syed |
| 2013/0057644 A1 | 3/2013 | Stefanoski |
| 2013/0063487 A1 | 3/2013 | Spiegel |
| 2013/0063549 A1 | 3/2013 | Schnyder |
| 2013/0071012 A1 | 3/2013 | Leichsenring |
| 2013/0076619 A1 | 3/2013 | Carr |
| 2013/0113830 A1 | 5/2013 | Suzuki |
| 2013/0120581 A1 | 5/2013 | Daniels |
| 2013/0127844 A1 | 5/2013 | Koeppel |
| 2013/0127847 A1 | 5/2013 | Jin |
| 2013/0129304 A1 | 5/2013 | Feinson |

(56) References Cited

U.S. PATENT DOCUMENTS

| | | |
|---|---|---|
| 2013/0141530 A1 | 6/2013 | Zavesky |
| 2013/0147795 A1 | 6/2013 | Kim |
| 2013/0147905 A1 | 6/2013 | Janahan |
| 2013/0154926 A1 | 6/2013 | Kim |
| 2013/0155180 A1 | 6/2013 | Wantland |
| 2013/0162634 A1 | 6/2013 | Baik |
| 2013/0162787 A1 | 6/2013 | Cho |
| 2013/0176392 A1 | 7/2013 | Carr |
| 2013/0195350 A1 | 8/2013 | Tanaka |
| 2013/0204411 A1 | 8/2013 | Clark |
| 2013/0208900 A1 | 8/2013 | Jon |
| 2013/0212538 A1 | 8/2013 | Lemire |
| 2013/0219357 A1 | 8/2013 | Reitan |
| 2013/0240628 A1 | 9/2013 | Van Der Merwe |
| 2013/0250045 A1 | 9/2013 | Ki |
| 2013/0271566 A1 | 10/2013 | Chen |
| 2013/0278596 A1 | 10/2013 | Wu |
| 2013/0314442 A1 | 11/2013 | Langlotz |
| 2014/0002440 A1 | 1/2014 | Lynch |
| 2014/0002472 A1 | 1/2014 | Sobeski |
| 2014/0009462 A1 | 1/2014 | Mcnamer |
| 2014/0013414 A1 | 1/2014 | Bruck |
| 2014/0023341 A1 | 1/2014 | Wang |
| 2014/0037198 A1 | 2/2014 | Diane |
| 2014/0040742 A1 | 2/2014 | Hyekyung |
| 2014/0049607 A1 | 2/2014 | Amon |
| 2014/0059674 A1 | 2/2014 | Sun |
| 2014/0063005 A1 | 3/2014 | Ahn |
| 2014/0078136 A1 | 3/2014 | Sohn |
| 2014/0086551 A1 | 3/2014 | Kaneko |
| 2014/0087877 A1 | 3/2014 | Krishnan |
| 2014/0092259 A1 | 4/2014 | Tsang |
| 2014/0100995 A1 | 4/2014 | Koshy |
| 2014/0107888 A1 | 4/2014 | Quast |
| 2014/0118479 A1 | 5/2014 | Rapoport |
| 2014/0118483 A1 | 5/2014 | Rapoport |
| 2014/0118494 A1 | 5/2014 | Wu |
| 2014/0125659 A1 | 5/2014 | Yoshida |
| 2014/0132594 A1 | 5/2014 | Gharpure |
| 2014/0152834 A1 | 6/2014 | Kosseifi |
| 2014/0153832 A1 | 6/2014 | Kwatra |
| 2014/0177927 A1 | 6/2014 | Shieh |
| 2014/0192155 A1 | 7/2014 | Choi |
| 2014/0198184 A1 | 7/2014 | Stein |
| 2014/0199050 A1 | 7/2014 | Khalsa |
| 2014/0211989 A1 | 7/2014 | Ding |
| 2014/0225930 A1 | 8/2014 | Durmek |
| 2014/0232634 A1 | 8/2014 | Piemonte |
| 2014/0253436 A1 | 9/2014 | Petersen |
| 2014/0253746 A1 | 9/2014 | Voss |
| 2014/0267616 A1 | 9/2014 | Krig |
| 2014/0275704 A1 | 9/2014 | Zhang |
| 2014/0286566 A1 | 9/2014 | Rhoads |
| 2014/0293004 A1 | 10/2014 | Tsubaki |
| 2014/0293028 A1 | 10/2014 | Nguyen |
| 2014/0297798 A1 | 10/2014 | Bakalash |
| 2014/0307045 A1 | 10/2014 | Richardt |
| 2014/0340404 A1 | 11/2014 | Wang |
| 2014/0362198 A1 | 12/2014 | Nakayama |
| 2014/0365888 A1 | 12/2014 | Curzon |
| 2014/0375684 A1 | 12/2014 | Algreatly |
| 2015/0009130 A1 | 1/2015 | Motta |
| 2015/0010218 A1 | 1/2015 | Bayer |
| 2015/0016714 A1 | 1/2015 | Chui |
| 2015/0022518 A1 | 1/2015 | Takeshita |
| 2015/0022677 A1 | 1/2015 | Guo |
| 2015/0042812 A1 | 2/2015 | Tang |
| 2015/0046875 A1 | 2/2015 | Xu |
| 2015/0073570 A1 | 3/2015 | Gonzalez-Mendoza |
| 2015/0078449 A1 | 3/2015 | Diggins |
| 2015/0097961 A1 | 4/2015 | Ure |
| 2015/0103170 A1 | 4/2015 | Nelson |
| 2015/0103197 A1 | 4/2015 | Djordjevic |
| 2015/0130799 A1 | 5/2015 | Holzer |
| 2015/0130800 A1 | 5/2015 | Holzer |
| 2015/0130894 A1 | 5/2015 | Holzer |
| 2015/0134651 A1 | 5/2015 | Holzer |
| 2015/0138190 A1 | 5/2015 | Holzer |
| 2015/0143239 A1 | 5/2015 | Birkbeck |
| 2015/0154442 A1 | 6/2015 | Takahashi |
| 2015/0156415 A1 | 6/2015 | Gallup |
| 2015/0188967 A1 | 7/2015 | Paulauskas |
| 2015/0193863 A1 | 7/2015 | Cao |
| 2015/0193963 A1 | 7/2015 | Chen |
| 2015/0198443 A1 | 7/2015 | Yi |
| 2015/0201176 A1 | 7/2015 | Graziosi |
| 2015/0206341 A1 | 7/2015 | Loper |
| 2015/0213784 A1 | 7/2015 | Jafarzadeh |
| 2015/0222880 A1 | 8/2015 | Choi |
| 2015/0227285 A1 | 8/2015 | Lee |
| 2015/0227816 A1 | 8/2015 | Du |
| 2015/0235408 A1 | 8/2015 | Gross |
| 2015/0242686 A1 | 8/2015 | Lenka |
| 2015/0254224 A1 | 9/2015 | Kim |
| 2015/0269772 A1 | 9/2015 | Ha |
| 2015/0271356 A1 | 9/2015 | Terada |
| 2015/0281323 A1 | 10/2015 | Gold |
| 2015/0294492 A1 | 10/2015 | Koch |
| 2015/0309695 A1 | 10/2015 | Sannandeji |
| 2015/0318020 A1 | 11/2015 | Pribula |
| 2015/0319424 A1 | 11/2015 | Haimovitch-Yogev |
| 2015/0324649 A1 | 11/2015 | Grewe |
| 2015/0325044 A1 | 11/2015 | Lebovitz |
| 2015/0339846 A1 | 11/2015 | Holzer |
| 2015/0371440 A1 | 12/2015 | Pirchheim |
| 2015/0379763 A1 | 12/2015 | Liktor |
| 2016/0001137 A1 | 1/2016 | Phillips |
| 2016/0012646 A1 | 1/2016 | Huang |
| 2016/0026253 A1 | 1/2016 | Bradski |
| 2016/0027209 A1 | 1/2016 | Demirli |
| 2016/0034459 A1 | 2/2016 | Larsen |
| 2016/0042251 A1 | 2/2016 | Cordova-Diba |
| 2016/0044240 A1 | 2/2016 | Beers |
| 2016/0050368 A1 | 2/2016 | Seo |
| 2016/0055330 A1 | 2/2016 | Morishita |
| 2016/0061582 A1 | 3/2016 | Lucey |
| 2016/0063740 A1 | 3/2016 | Sakimoto |
| 2016/0066119 A1 | 3/2016 | Wu |
| 2016/0077422 A1 | 3/2016 | Wang |
| 2016/0078287 A1 | 3/2016 | Auge |
| 2016/0080684 A1 | 3/2016 | Farrell |
| 2016/0080830 A1 | 3/2016 | Kim |
| 2016/0086381 A1 | 3/2016 | Jung |
| 2016/0088287 A1 | 3/2016 | Sadi |
| 2016/0104316 A1 | 4/2016 | Shenkar |
| 2016/0110913 A1 | 4/2016 | Kosoy |
| 2016/0139794 A1 | 5/2016 | Hammendorp |
| 2016/0140125 A1 | 5/2016 | Goyal |
| 2016/0148349 A1 | 5/2016 | Cho |
| 2016/0171330 A1* | 6/2016 | Mentese ............... G01S 3/7864 348/170 |
| 2016/0189334 A1 | 6/2016 | Mason |
| 2016/0191895 A1 | 6/2016 | Yun |
| 2016/0203586 A1 | 7/2016 | Chang |
| 2016/0205341 A1 | 7/2016 | Hollander |
| 2016/0210602 A1 | 7/2016 | Siddique |
| 2016/0261855 A1 | 9/2016 | Park |
| 2016/0267676 A1 | 9/2016 | Setomoto |
| 2016/0275283 A1 | 9/2016 | De Leon |
| 2016/0275723 A1 | 9/2016 | Singh |
| 2016/0295127 A1 | 10/2016 | Yu |
| 2016/0350930 A1 | 12/2016 | Lin |
| 2016/0350975 A1 | 12/2016 | Nakagawa |
| 2016/0353089 A1 | 12/2016 | Gallup |
| 2016/0358337 A1 | 12/2016 | Dai |
| 2016/0379415 A1 | 12/2016 | Espeset |
| 2017/0018054 A1 | 1/2017 | Holzer |
| 2017/0018055 A1 | 1/2017 | Holzer |
| 2017/0018056 A1 | 1/2017 | Holzer |
| 2017/0024094 A1 | 1/2017 | Gresham |
| 2017/0026574 A1 | 1/2017 | Kwon |
| 2017/0053169 A1 | 2/2017 | Cuban |
| 2017/0067739 A1 | 3/2017 | Siercks |
| 2017/0084001 A1 | 3/2017 | Holzer |

(56) References Cited

U.S. PATENT DOCUMENTS

| | | |
|---|---|---|
| 2017/0084293 A1 | 3/2017 | Holzer |
| 2017/0087415 A1 | 3/2017 | Nandimandalam |
| 2017/0103510 A1 | 4/2017 | Wang |
| 2017/0103584 A1 | 4/2017 | Vats |
| 2017/0109930 A1 | 4/2017 | Holzer |
| 2017/0124769 A1 | 5/2017 | Saito |
| 2017/0124770 A1 | 5/2017 | Vats |
| 2017/0126988 A1 | 5/2017 | Holzer |
| 2017/0140236 A1 | 5/2017 | Price |
| 2017/0148179 A1 | 5/2017 | Holzer |
| 2017/0148186 A1 | 5/2017 | Holzer |
| 2017/0148199 A1 | 5/2017 | Holzer |
| 2017/0148222 A1 | 5/2017 | Holzer |
| 2017/0148223 A1 | 5/2017 | Holzer |
| 2017/0158131 A1 | 6/2017 | Friebe |
| 2017/0206648 A1 | 7/2017 | Marra |
| 2017/0213385 A1 | 7/2017 | Yu |
| 2017/0231550 A1 | 8/2017 | Do |
| 2017/0236287 A1 | 8/2017 | Shen |
| 2017/0249339 A1 | 8/2017 | Lester |
| 2017/0255648 A1 | 9/2017 | Dube |
| 2017/0256066 A1 | 9/2017 | Richard |
| 2017/0277363 A1 | 9/2017 | Holzer |
| 2017/0277952 A1 | 9/2017 | Thommes |
| 2017/0278544 A1 | 9/2017 | Choi |
| 2017/0287137 A1 | 10/2017 | Lin |
| 2017/0293894 A1 | 10/2017 | Taliwal |
| 2017/0308771 A1 | 10/2017 | Shimauchi |
| 2017/0316092 A1 | 11/2017 | Fichter |
| 2017/0330319 A1 | 11/2017 | Xu |
| 2017/0337693 A1 | 11/2017 | Baruch |
| 2017/0344223 A1 | 11/2017 | Holzer |
| 2017/0344808 A1 | 11/2017 | El-Khamy |
| 2017/0357910 A1 | 12/2017 | Sommer |
| 2017/0359570 A1 | 12/2017 | Holzer |
| 2017/0364766 A1 | 12/2017 | Das |
| 2017/0372523 A1 | 12/2017 | Espeset |
| 2018/0012330 A1 | 1/2018 | Holzer |
| 2018/0012529 A1 | 1/2018 | Chiba |
| 2018/0035105 A1 | 2/2018 | Choi |
| 2018/0035500 A1 | 2/2018 | Song |
| 2018/0045592 A1 | 2/2018 | Okita |
| 2018/0046356 A1 | 2/2018 | Holzer |
| 2018/0046357 A1 | 2/2018 | Holzer |
| 2018/0046649 A1 | 2/2018 | Dal Mutto |
| 2018/0052665 A1 | 2/2018 | Kaur |
| 2018/0063504 A1 | 3/2018 | Haines |
| 2018/0082715 A1 | 3/2018 | Rymkowski |
| 2018/0143023 A1 | 5/2018 | Bjorke |
| 2018/0143756 A1 | 5/2018 | Mildrew |
| 2018/0144547 A1 | 5/2018 | Shakib |
| 2018/0155057 A1 | 6/2018 | Irish |
| 2018/0158197 A1 | 6/2018 | Dasgupta |
| 2018/0165875 A1 | 6/2018 | Yu |
| 2018/0199025 A1 | 7/2018 | Holzer |
| 2018/0203877 A1 | 7/2018 | Holzer |
| 2018/0205941 A1 | 7/2018 | Kopf |
| 2018/0211131 A1 | 7/2018 | Holzer |
| 2018/0211373 A1 | 7/2018 | Stoppa |
| 2018/0211404 A1 | 7/2018 | Zhu |
| 2018/0218235 A1 | 8/2018 | Holzer |
| 2018/0218236 A1 | 8/2018 | Holzer |
| 2018/0234671 A1 | 8/2018 | Yang |
| 2018/0240243 A1 | 8/2018 | Kim |
| 2018/0255290 A1 | 9/2018 | Holzer |
| 2018/0268220 A1 | 9/2018 | Lee |
| 2018/0268256 A1 | 9/2018 | Di Febbo |
| 2018/0286098 A1 | 10/2018 | Lorenzo |
| 2018/0293774 A1 | 10/2018 | Yu |
| 2018/0315200 A1 | 11/2018 | Davydov |
| 2018/0336724 A1 | 11/2018 | Spring |
| 2018/0336737 A1 | 11/2018 | Varady |
| 2018/0338126 A1 | 11/2018 | Trevor |
| 2018/0338128 A1 | 11/2018 | Trevor |
| 2018/0357518 A1 | 12/2018 | Sekii |
| 2018/0374273 A1 | 12/2018 | Holzer |
| 2019/0019056 A1 | 1/2019 | Pierce |
| 2019/0025544 A1 | 1/2019 | Watanabe |
| 2019/0026956 A1 | 1/2019 | Gausebeck |
| 2019/0026958 A1 | 1/2019 | Gausebeck |
| 2019/0035149 A1 | 1/2019 | Chen |
| 2019/0035179 A1 | 1/2019 | Bhardwaj |
| 2019/0050664 A1 | 2/2019 | Yang |
| 2019/0080499 A1 | 3/2019 | Holzer |
| 2019/0094981 A1 | 3/2019 | Bradski |
| 2019/0132569 A1 | 5/2019 | Karpenko |
| 2019/0147221 A1 | 5/2019 | Grabner |
| 2019/0209886 A1 | 7/2019 | Harlow |
| 2019/0213392 A1 | 7/2019 | Pan |
| 2019/0213406 A1 | 7/2019 | Porikli |
| 2019/0220991 A1 | 7/2019 | Holzer |
| 2019/0221021 A1 | 7/2019 | Holzer |
| 2019/0222776 A1 | 7/2019 | Carter |
| 2019/0235729 A1 | 8/2019 | Day |
| 2019/0244372 A1 | 8/2019 | Holzer |
| 2019/0251738 A1 | 8/2019 | Holzer |
| 2019/0278434 A1 | 9/2019 | Holzer |
| 2019/0304064 A1 | 10/2019 | Zhang |
| 2019/0364265 A1 | 11/2019 | Matsunobu |
| 2020/0027263 A1 | 1/2020 | Holzer |
| 2020/0045249 A1 | 2/2020 | Francois |
| 2020/0125877 A1 | 4/2020 | Phan |
| 2020/0128060 A1 | 4/2020 | Han |
| 2020/0137380 A1 | 4/2020 | Supikov |
| 2020/0167570 A1 | 5/2020 | Beall |
| 2020/0207358 A1 | 7/2020 | Katz |
| 2020/0234397 A1 | 7/2020 | Holzer |
| 2020/0234451 A1 | 7/2020 | Holzer |

FOREIGN PATENT DOCUMENTS

| | | |
|---|---|---|
| CN | 105849781 B | 8/2016 |
| CN | 107466474 A | 12/2017 |
| DE | 112014005165 | 7/2016 |
| DE | 112017004150 | 6/2019 |
| GB | 2534821 A | 8/2016 |
| KR | 20120110861 | 10/2012 |
| KR | 101590256 B1 | 2/2016 |
| WO | 2015073570 A2 | 5/2015 |
| WO | 2017053197 A1 | 3/2017 |
| WO | 2018035500 A1 | 2/2018 |
| WO | 2018052665 A1 | 3/2018 |
| WO | 2018154331 A1 | 8/2018 |
| WO | 2019209886 | 10/2019 |
| WO | 2020092177 A2 | 5/2020 |

OTHER PUBLICATIONS

Zheng, et al., Conditional Random Fields as Recurrent Neural Networks, IEEE International Conference on Computer Vision, 2016, 1529-1537 pgs.

Office Action (Final Rejection) dated Jul. 22, 2022 for U.S. Appl. No. 15/427,030 (pp. 1-18).

Office Action (Final Rejection) dated Sep. 2, 2022 for U.S. Appl. No. 16/362,547 (pp. 1-15).

English Translation of CN104462365A (Year: 2015).

Office Action (Non-Final Rejection) dated Sep. 12, 2022 for U.S. Appl. No. 16/813,506 (pp. 1-15).

Office Action (Non-Final Rejection) dated Sep. 16, 2022 for U.S. Appl. No. 17/373,737 (pp. 1-8).

Office Action (Non-Final Rejection) dated Oct. 5, 2022 for U.S. Appl. No. 17/519,452 (pp. 1-17).

Office Action (Non-Final Rejection) dated Oct. 4, 2022 for U.S. Appl. No. 17/352,654 (pp. 1-19).

Office Action (Non-Final Rejection) dated Oct. 5, 2022 for U.S. Appl. No. 17/483,573 (pp. 1-20).

Office Action (Notice of Allowance and Fees Due (PTOL-85)) dated Jun. 22, 2023 for U.S. Appl. No. 14/861,019 (pp. 1-10).

Office Action (Non-Final Rejection) dated Jan. 10, 2023 for U.S. Appl. No. 15/427,030 (pp. 1-5).

(56) References Cited

OTHER PUBLICATIONS

Office Action (Final Rejection) dated Jan. 18, 2023 for U.S. Appl. No. 17/352,654 (pp. 1-21).
Office Action (Notice of Allowance and Fees Due (PTOL-85)) dated Jan. 17, 2023 for U.S. Appl. No. 17/373,737 (pp. 1-5).
Office Action (Notice of Allowance and Fees Due (PTOL-85)) dated Jan. 19, 2023 for U.S. Appl. No. 16/362,547 (pp. 1-5).
Office Action (Notice of Allowance and Fees Due (PTOL-85)) dated Feb. 1, 2023 for U.S. Appl. No. 16/362,547 (pp. 1-2).
Office Action dated Feb. 2, 2023 for U.S. Appl. No. 17/814,820 (pp. 1-34).
Office Action (Final Rejection) dated Feb. 17, 2023 for U.S. Appl. No. 17/519,452 (pp. 1-18).
Jaesik Choi, Ziyu Wang, Sang-Chul Lee, Won J. Jeon. A spatio-temporal pyramid matching for video retrieval. Computer Vision and Image Understanding. vol. 117, Issue 6. 2013. pp. 660-669 (Year: 2013).
Office Action (Final Rejection) dated Feb. 21, 2023 for U.S. Appl. No. 17/483,573 (pp. 1-23).
Office Action (Non-Final Rejection) dated Mar. 27, 2023 for U.S. Appl. No. 17/519,457 (pp. 1-12).
Office Action (Non-Final Rejection) dated Mar. 30, 2023 for U.S. Appl. No. 17/814,823 (pp. 1-17).
Office Action (Non-Final Rejection) dated Mar. 30, 2023 for U.S. Appl. No. 17/814,821 (pp. 1-10).
Office Action (Final Rejection) dated Apr. 19, 2023 for U.S. Appl. No. 16/813,506 (pp. 1-14).
Office Action (Non-Final Rejection) dated Jul. 21, 2023 for U.S. Appl. No. 17/483,573 (pp. 1-18).
Office Action (Notice of Allowance and Fees Due (PTOL-85)) dated Jul. 28, 2023 for U.S. Appl. No. 17/814,823 (pp. 1-5).
Office Action (Notice of Allowance and Fees Due (PTOL-85)) dated Aug. 2, 2023 for U.S. Appl. No. 17/352,654 (pp. 1-8).
Office Action (Non-Final Rejection) dated Aug. 23, 2023 for U.S. Appl. No. 17/519,457 (pp. 1-15).
Office Action (Ex Parte Quayle Action) dated Aug. 24, 2023 for U.S. Appl. No. 16/813,506 (pp. 1-5).
Office Action (Final Rejection) dated Sep. 13, 2023 for U.S. Appl. No. 17/814,821 (pp. 1-10).
Office Action (Notice of Allowance and Fees Due (PTOL-85)) dated Sep. 13, 2023 for U.S. Appl. No. 17/814,820 (pp. 1-8).
Office Action (Non-Final Rejection) dated Oct. 5, 2023 for U.S. Appl. No. 17/935,239 (pp. 1-13).
Office Action (Final Rejection) dated Dec. 6, 2023 for U.S. Appl. No. 17/483,573 (pp. 1-18).
Office Action (Non-Final Rejection) dated Dec. 7, 2023 for U.S. Appl. No. 18/183,917 (pp. 1-18).
Office Action (Final Rejection) dated Dec. 7, 2023 for U.S. Appl. No. 15/427,030 (pp. 1-5).
Office Action (Notice of Allowance and Fees Due (PTOL-85)) dated Jan. 2, 2024 for U.S. Appl. No. 17/935,239 (pp. 1-9).
Office Action (Notice of Allowance and Fees Due (PTOL-85)) dated Jan. 8, 2024 for U.S. Appl. No. 16/813,506 (pp. 1-7).
Office Action (Final Rejection) dated Jan. 8, 2024 for U.S. Appl. No. 17/519,457 (pp. 1-15).
Office Action (Notice of Allowance and Fees Due (PTOL-85)) dated Jan. 12, 2024 for U.S. Appl. No. 17/814,821 (pp. 1-5).
Office Action (Notice of Allowance and Fees Due (PTOL-85)) dated Feb. 20, 2024 for U.S. Appl. No. 17/519,452 (pp. 1-5).
Office Action (Final Rejection) dated Apr. 3, 2024 for U.S. Appl. No. 18/183,917 (pp. 1-16).
U.S. Appl. No. 14/539,814, Non Final Office Action mailed Dec. 30, 2016, 37 pgs.
U.S. Appl. No. 14/539,889, Non-Final Office Action mailed Oct. 6, 2016, 14 pages.
U.S. Appl. No. 14/800,638, Advisory Action mailed May 9, 2017, 5 pgs.
U.S. Appl. No. 14/800,638, Examiner Interview Summary mailed May 9, 2017, 2 pgs.
U.S. Appl. No. 14/800,638, Examiner Interview Summary mailed Nov. 7, 2016, 3 pgs.
U.S. Appl. No. 14/800,638, Examiner Interview Summary mailed Dec. 13, 2017, 1 pg.
U.S. Appl. No. 14/800,638, Final Office Action mailed Jan. 20, 2017, 12 pgs.
U.S. Appl. No. 14/800,638, Non Final Office Action mailed Jun. 15, 2017, 12 pgs.
U.S. Appl. No. 14/800,638, Notice of Allowance mailed Dec. 13, 2017, 9 pgs.
U.S. Appl. No. 14/800,640, Advisory Action mailed Jan. 5, 2018, 3 pgs.
U.S. Appl. No. 14/800,640, Advisory Action mailed Feb. 8, 2018, 2 pgs.
U.S. Appl. No. 14/800,640, Examiner Interview Summary mailed Feb. 8, 2018, 1 pg.
U.S. Appl. No. 14/800,640, Examiner Interview Summary mailed Oct. 23, 2018, 3 pgs.
U.S. Appl. No. 14/800,640, Final Office Action mailed Oct. 16, 2017, 15 pgs.
U.S. Appl. No. 14/800,640, Non Final Office Action mailed Jun. 8, 2017, 14 pgs.
U.S. Appl. No. 14/800,640, Non Final Office Action mailed Jul. 17, 2018, 16 pgs.
U.S. Appl. No. 14/800,640, Notice of Allowance mailed Nov. 21, 2018, 7 pgs.
U.S. Appl. No. 14/800,640, Restriction Requirement mailed Mar. 3, 2017, 5 pgs.
U.S. Appl. No. 14/800,642, Advisory Action mailed Jan. 5, 2018, 3 pgs.
U.S. Appl. No. 14/800,642, Advisory Action mailed Feb. 8, 2018, 3 pgs.
U.S. Appl. No. 14/800,642, Examiner Interview Summary mailed Aug. 6, 2018, 1 pg.
U.S. Appl. No. 14/800,642, Final Office Action mailed Oct. 17, 2017, 18 pgs.
U.S. Appl. No. 14/800,642, Non Final Office Action mailed May 18, 2017, 17 pgs.
U.S. Appl. No. 14/800,642, Non-Final Office Action mailed May 18, 2017, 17 pages.
U.S. Appl. No. 14/800,642, Notice of Allowance mailed Aug. 6, 2018, 12 pgs.
U.S. Appl. No. 14/819,473, Examiner Interview Summary mailed Jul. 11, 2016, 3 pgs.
U.S. Appl. No. 14/819,473, Examiner Interview Summary mailed Aug. 17, 2016, 3 pgs.
U.S. Appl. No. 14/819,473, Examiner Interview Summary mailed Oct. 14, 2016, 3 pages.
U.S. Appl. No. 14/819,473, Final Office Action mailed Apr. 28, 2016, 45 pgs.
U.S. Appl. No. 14/819,473, Non Final Office Action mailed Sep. 1, 2016, 36 pgs.
U.S. Appl. No. 14/819,473, Non Final Office Action mailed Oct. 8, 2015, 44 pgs.
U.S. Appl. No. 14/860,983, Advisory Action mailed Jan. 23, 2018, 3 pgs.
U.S. Appl. No. 14/860,983, Advisory Action mailed Mar. 26, 2019, 2 pgs.
U.S. Appl. No. 14/860,983, Examiner Interview Summary mailed Mar. 26, 2019, 2 pgs.
U.S. Appl. No. 14/860,983, Examiner Interview Summary mailed Apr. 8, 2019, 3 pgs.
U.S. Appl. No. 14/860,983, Examiner Interview Summary mailed Nov. 15, 2018, 3 pgs.
U.S. Appl. No. 14/860,983, Final Office Action mailed Jan. 18, 2019, 19 pgs.
U.S. Appl. No. 14/860,983, Final Office Action mailed Oct. 18, 2017, 21 pgs.
U.S. Appl. No. 14/860,983, Non Final Office Action mailed Jun. 8, 2017, 26 pgs.
U.S. Appl. No. 14/860,983, Non Final Office Action mailed Aug. 7, 2018, 22 pgs.

(56) References Cited

OTHER PUBLICATIONS

U.S. Appl. No. 15/408,211, Advisory Action mailed Mar. 18, 2019, 4 pgs.
U.S. Appl. No. 15/408,211, Examiner Interview Summary mailed Mar. 4, 2019, 3 pgs.
U.S. Appl. No. 15/408,211, Examiner Interview Summary mailed Mar. 18, 2019, 2 pgs.
U.S. Appl. No. 15/408,211, Examiner Interview Summary mailed Apr. 3, 2019, 3 pgs.
U.S. Appl. No. 15/408,211, Examiner Interview Summary mailed Aug. 5, 2019, 3 pgs.
U.S. Appl. No. 15/408,211, Examiner Interview Summary mailed Oct. 16, 2019, 2 pgs.
U.S. Appl. No. 15/408,211, Examiner Interview Summary mailed Dec. 5, 2018, 3 pgs.
U.S. Appl. No. 15/408,211, Final Office Action mailed Jan. 11, 2019, 23 pgs.
U.S. Appl. No. 15/408,211, Non Final Office Action mailed Aug. 6, 2018, 22 pgs.
U.S. Appl. No. 15/408,211, Non Final Office Action Mailed May 2, 2019, 20 pgs.
Matsunobu, Tom et al., U.S. Appl. No. 62/457,276, Specification, p. 1-19 (Year: 2017).
Mian, Ajmal S. et al., "Three-Dimensional Model-Based Object Recognition and Segmentation in Cluttered Scenes", IEEE Transactions on Pattern Analysis and Machine Intelligence, col. 28, No. 10, Oct. 2006, 1584-1601.
Mikolajczyk, Krystian, et al., A Performance Evaluation of Local Descriptors, IEEE Transactions on Pattern Analysis and Machine Intelligence, vol. 27, No. 10, Oct. 2005, 1615-1630.
Notice of Allowance dated Apr. 20, 2021 for U.S. Appl. No. 15/969,749 (pp. 1-5).
Notice of Allowance dated Jun. 17, 2021 for U.S. Appl. No. 15/604,938 (pp. 1-12).
Notice of Allowance dated May 3, 2021 for U.S. Appl. No. 15/632,709 (pp. 1-9).
Nutzi, Gabriel, et al. "Fusion of IMU and vision for absolute scale estimation in monocular SLAM." Journal of intelligent & robotic Systems 61.1-4 (2011): 287-299. (Year: 2011).
Office Action (Final Rejection) dated Jan. 19, 2022 for U.S. Appl. No. 16/726,090 (pp. 1-16).
Office Action (Final Rejection) dated Apr. 25, 2022 for U.S. Appl. No. 16/813,506 (pp. 1-17).
Office Action (Final Rejection) dated Jul. 6, 2022 for U.S. Appl. No. 14/861,019 (pp. 1-36).
Office Action (Final Rejection) dated Aug. 20, 2021 for U.S. Appl. No. 16/362,547 (pp. 1-15).
Office Action (Non-Final Rejection) dated Mar. 21, 2022 for U.S. Appl. No. 14/861,019 (pp. 1-32).
Office Action (Non-Final Rejection) dated Mar. 24, 2022 for U.S. Appl. No. 16/362,547 (pp. 1-14).
Office Action (Non-Final Rejection) dated Apr. 14, 2022 for U.S. Appl. No. 17/338,217 (pp. 1-10).
Office Action (Non-Final Rejection) dated Sep. 22, 2021 for U.S. Appl. No. 16/726,090 (pp. 1-15).
Office Action (Non-Final Rejection) dated Oct. 14, 2021 for U.S. Appl. No. 15/427,030 (pp. 1-17).
Office Action (Non-Final Rejection) dated Oct. 28, 2021 for U.S. Appl. No. 16/813,506 (pp. 1-19).
Office Action (Non-Final Rejection) dated Nov. 10, 2021 for U.S. Appl. No. 16/389,544 (pp. 1-28).
Office Action (Notice of Allowance and Fees Due (PTOL-85)) dated May 18, 2022 for U.S. Appl. No. 16/389,544 (pp. 1-8).
Office Action (Notice of Allowance and Fees Due (PTOL-85)) dated Jun. 2, 2022 for U.S. Appl. No. 16/726,090 (pp. 1-7).
Office Action (Notice of Allowance and Fees Due (PTOL-85)) dated Jun. 29, 2022 for U.S. Appl. No. 17/338,217 (pp. 1-9).
Office Action (Notice of Allowance and Fees Due (PTOL-85)) dated Sep. 16, 2021 for U.S. Appl. No. 16/179,746 (pp. 1-5).
Office Action (Notice of Allowance and Fees Due (PTOL-85)) dated Sep. 29, 2021 for U.S. Appl. No. 15/717,889 (pp. 1-12).
Office Action (Notice of Allowance and Fees Due (PTOL-85)) dated Sep. 30, 2021 for U.S. Appl. No. 16/179,746 (pp. 1-2).
Office Action (Notice of Allowance and Fees Due (PTOL-85)) dated Oct. 15, 2021 for U.S. Appl. No. 16/179,746 (pp. 1-2).
Office Action dated Apr. 1, 2021 for U.S. Appl. No. 15/427,030 (pp. 1-18).
Office Action dated Apr. 1, 2021 for U.S. Appl. No. 16/389,544 (pp. 1-29).
Office Action dated Apr. 9, 2021 for U.S. Appl. No. 16/554,996 (pp. 1-29).
Office Action dated Jun. 3, 2021 for U.S. Appl. No. 16/179,746 (pp. 1-26).
Office Action dated Mar. 12, 2021 for U.S. Appl. No. 16/726,090 (pp. 1-14).
Office Action dated Mar. 23, 2021 for U.S. Appl. No. 16/362,547 (pp. 1-15).
Pollard, Stephen et al., "Automatically Synthesising Virtual Viewpoints by Trinocular Image Interpolation—Detailed Report", HP, Technical Report, HP Laboratories Bristol HPL-97-166, Dec. 1997, 40 pgs.
Prisacariu, Victor A. et al., "Simultaneous 3D Tracking and Reconstruction on a Mobile Phone", IEEE International Symposium on Mixed and Augmented Reality, 2013, pp. 89-98.
Qi Pan et al., "Rapid Scene Reconstruction on Mobile Phones from Panoramic Images", Oct. 2011, pp. 55-64 (Year: 2011).
Russell, Bryan C, et al. "LabelMe: a database and web-based tool forimage annotation." International Journal of Computer vision 77.1-3 (2008): 157-173. (Year: 2008).
Saito, Hideo et al., "View Interpolation of Multiple Cameras Based on Projective Geometry", Department of Information and Computer Science, Keio University and Presto, Japan Science and Technology Corporation (JST), retrieved from the Internet <http://citeseerx.ist.psu.edu/viewdoc/download?doi=10.1.1.6.5162&rep=r ep1&type=pdf>, 6 pages. (2002).
Schiller, Ingo, et al., Datastructure for Capturing Dynamic Scenes with a Time-of-Flight Camera, Springer-Verlad, Dyna3D 2009, LNCS 5742, 42-57 pgs.
Seitz, Steven M., "Image-Based Transformation of Viewpoint and Scene Appearance", A Dissertation submitted in partial fulfillment of the requirements for the Degree of Doctor of Philosophy at the University of Wisconsin; retrieved from the Internet <http://homes.cs.washington.edu/~seitz/papers/thesis.pdf>, 1997, 111 pages.
Shade, Jonathan et al., "Layered Depth Images", Proceedings of the 25th Annual Conference on Computer Graphics and Interactive Techniques, ACM, SIGGRAPH, Jul. 24, 1998, pp. 231-242.
Shin, Hong-Chang et al., "Fast View Synthesis using GPU for 3D Display", IEEE Transactions on Consumer Electronics, vol. 54, No. 4, Dec. 2008, pp. 2068-2076.
Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.
Steder, Bastian et al., "Robust On-line Model-based Object Detection from Range Images", International Conference on Intelligent Robots and Systems, pp. 4739-4744, Oct. 15, 2009, 6 pages.
Supplemental Notice of Allowability dated May 5, 2021 for U.S. Appl. No. 15/969,749 (pp. 1-2).
Thyssen, Anthony , "ImageMagick v6 Examples—Color Basics and Channels", Website http://www.imagemagick.org/Usage/color basics/, Retrieved Dec. 23, 2016, Mar. 9, 2011, 31 pgs.
Torr, P.H.S. et al., "Robust Parameterization and Computation of the Trifocal Tensor", Elsevier, Image and Vision Computing, vol. 15, Issue 8, Aug. 1997, pp. 591-605.
United Kingdom Application Serial No. 1609577.0, Office Action mailed Jun. 15, 2016, 1 pg.
Utasi, Ákos, and Csaba Benedek. "A multi-view annotation tool for people detection evaluation." Proceedings of the 1st international Workshop on Visual interfaces forground truth collection in Computer vision applications. ACM, 2012. (Year: 2012) 7 pages.
Weigel, Christian, et al., Advanced 3D Video Object Synthesis Based on Trilinear Tensors, IEEE Tenth International Symposium on Consumer Electronics, 2006, 5 pages.

(56) References Cited

OTHER PUBLICATIONS

Xiao, Jiangjian et al., "Tri-view Morphing", Elsevier, Computer Vision and Image Understanding, vol. 96, Issue 3, Dec. 2004, pp. 345-366.

Zhang, Guofeng, et al., Video stabilization based on a 3D perspective camera model, Springer, The Visual Computer (2009) 25, 997 pg.

U.S. Appl. No. 15/425,983, Advisory Action mailed Oct. 12, 2018, 5 pgs.

U.S. Appl. No. 15/425,983, Examiner Interview Summary mailed May 3, 2018, 3 pgs.

U.S. Appl. No. 15/425,983, Examiner Interview Summary mailed May 17, 2018, 3 pgs.

U.S. Appl. No. 15/425,983, Examiner Interview Summary mailed Sep. 28, 2018, 3 pgs.

U.S. Appl. No. 15/425,983, Examiner Interview Summary mailed Oct. 12, 2018, 2 pgs.

U.S. Appl. No. 15/425,983, Examiner Interview Summary mailed Dec. 12, 2018, 2 pgs.

U.S. Appl. No. 15/425,983, Final Office Action mailed Jun. 26, 2018, 29 pgs.

U.S. Appl. No. 15/425,983, Non Final Office Action mailed Jan. 11, 2018, 29 pgs.

U.S. Appl. No. 15/425,983, Notice of Allowance mailed Dec. 12, 2018, 14 pgs.

U.S. Appl. No. 15/425,988, Examiner Interview Summary mailed Nov. 30, 2018, 3 pages.

U.S. Appl. No. 15/425,988, Non Final Office Action mailed Aug. 10, 2018, 18 pgs.

U.S. Appl. No. 15/425,988, Notice of Allowance mailed Dec. 28, 2018, 8 pgs.

U.S. Appl. No. 15/426,994, Advisory Action mailed Dec. 13, 2018, 3 pgs.

U.S. Appl. No. 15/426,994, Examiner Interview Summary mailed Jan. 15, 2019, 3 pgs.

U.S. Appl. No. 15/426,994, Final Office Action mailed Oct. 10, 2018, 21 pgs.

U.S. Appl. No. 15/426,994, Non Final Office Action mailed Apr. 19, 2018, 22 pgs.

U.S. Appl. No. 15/426,994, Non Final Office Action mailed Aug. 6, 2019, 22 pgs.

U.S. Appl. No. 15/427,009, Notice of Allowance mailed Sep. 6, 2018, 9 pgs.

U.S. Appl. No. 15/428,104, Advisory Action mailed Dec. 13, 2018, 3 pgs.

U.S. Appl. No. 15/428,104, Examiner Interview Summary mailed Jan. 15, 2019, 3 pgs.

U.S. Appl. No. 15/428,104, Examiner Interview Summary mailed Dec. 7, 2018, 3 pgs.

U.S. Appl. No. 15/428,104, Final Office Action mailed Oct. 10, 2018, 23 pgs.

U.S. Appl. No. 15/428,104, Non Final Office Action mailed Apr. 19, 2018, 21 pgs.

U.S. Appl. No. 15/428,104, Non Final Office Action mailed Aug. 6, 2019, 24 pgs.

U.S. Appl. No. 15/620,506, Advisory Action mailed Aug. 26, 2019, 2 pgs.

U.S. Appl. No. 15/620,506, Examiner Inteview Summary mailed Aug. 26, 2019, 1 pg.

U.S. Appl. No. 15/620,506, Final Office Action mailed Jun. 10, 2019, 17 pgs.

U.S. Appl. No. 15/620,506, Non-Final Office Action mailed Jan. 23, 2019, 13 pages.

U.S. Appl. No. 15/632,709, Examiner Interview Summary mailed Apr. 30, 2018, 1 pg.

U.S. Appl. No. 15/632,709, Final Office Action mailed Jul. 17, 2018, 12 pgs.

U.S. Appl. No. 15/632,709, Non Final Office Action mailed Apr. 3, 2019, 13 pgs.

U.S. Appl. No. 15/632,709, Non Final Office Action mailed Apr. 30, 2018, 14 pgs.

U.S. Appl. No. 15/632,709, Notice of Allowance mailed May 3, 2021, 9 pgs.

U.S. Appl. No. 15/673,125, Examiner Interview Summary mailed Aug. 1, 2019, 3 pgs.

U.S. Appl. No. 15/673,125, Final Office Action mailed Jun. 3, 2019, 17 pgs.

U.S. Appl. No. 15/673,125, Non Final Office Action mailed Feb. 6, 2019, 17 pgs.

U.S. Appl. No. 15/682,362, Notice of Allowance mailed Oct. 22, 2018, 9 pgs.

U.S. Appl. No. 15/713,406, Examiner Interview Summary mailed Aug. 2, 2019, 3 pgs.

U.S. Appl. No. 15/713,406, Final Office Action mailed Jun. 3, 2019, 21 pgs.

U.S. Appl. No. 15/713,406, Non Final Office Action mailed Jan. 30, 2019, 21 pgs.

U.S. Appl. No. 15/717,889, Advisory Action mailed Jul. 6, 2021, 3 pgs.

U.S. Appl. No. 15/717,889, Examiner Interview Summary mailed Jun. 4, 2021, 2 pgs.

U.S. Appl. No. 15/717,889, Examiner Interview Summary mailed Jul. 6, 2021, 2 pgs.

U.S. Appl. No. 15/717,889, Final Office Action mailed Mar. 4, 2021, 37 pgs.

U.S. Appl. No. 15/724,081, Examiner Interview Summary mailed Mar. 4, 2019, 3 pgs.

U.S. Appl. No. 15/724,081, Examiner Interview Summary mailed Jul. 30, 2019, 3 pgs.

U.S. Appl. No. 15/724,081, Examiner Interview Summary mailed Aug. 20, 2019, 2 pgs.

U.S. Appl. No. 15/724,081, Final Office Action Mailed May 14, 2019, 14 pgs.

U.S. Appl. No. 15/724,081, Non Final Office Action mailed Dec. 11, 2018, 12 pgs.

U.S. Appl. No. 15/724,081, Notice of Allowance mailed Aug. 20, 2019, 12 pgs.

U.S. Appl. No. 15/724,087, Final Office Action mailed Jul. 1, 2019, 16 pgs.

U.S. Appl. No. 15/724,087, Non Final Office Action mailed Jan. 31, 2019, 15 pgs.

U.S. Appl. No. 15/911,993, Notice of Allowance mailed Jan. 12, 2021, 8 pgs.

U.S. Appl. No. 15/969,749, Examiner Interview Summary mailed Apr. 20, 2021, 1 pg.

U.S. Appl. No. 16/179,746, Examiner Interview Summary mailed Jun. 3, 2021, 1 pg.

U.S. Appl. No. 16/179,746, Final Office Action mailed Jun. 3, 2021, 25 pgs.

U.S. Appl. No. 16/179,746, Non-Final Office Action mailed Feb. 11, 2021, 25 pgs.

U.S. Appl. No. 16/362,547, Examiner Interview Summary mailed Jul. 12, 2021, 2 pgs.

U.S. Appl. No. 16/362,547, Non-Final Office Action mailed Mar. 23, 2021, 14 pgs.

U.S. Appl. No. 16/384,578, Corrected Notice of Allowance mailed Nov. 26, 2019, 2 pgs.

U.S. Appl. No. 16/384,578, Non Final Office Action mailed May 9, 2019, 9 pgs.

U.S. Appl. No. 16/726,090, Advisory Action mailed Jun. 21, 2021, 3 pgs.

U.S. Appl. No. 16/726,090, Examiner Interview Summary mailed Feb. 25, 2021, 3 pgs.

U.S. Appl. No. 16/726,090, Examiner Interview Summary mailed Jun. 21, 2021, 1 pg.

U.S. Appl. No. 16/778,981, Corrected Notice of Allowance mailed Mar. 31, 2021, 11 pgs.

U.S. Appl. No. 16/778,981, Examiner Interview Summary mailed Mar. 31, 2021, 1 pg.

U.S. Appl. No. 16/778,981, Notice of Allowance mailed Mar. 9, 2021, 9 pgs.

(56) References Cited

OTHER PUBLICATIONS

Ballan, Luca et al., "Unstructured Video-Based Rendering: Interactive Exploration of Casually Captured Videos", ACM, ACM Transactions on Graphics (TOG)—Proceedings of ACM SIGGRAPH 2010, vol. 29, Issue 4, Article No. 87, Jul. 30, 2010, 11 pages.
Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).
Buehler, Chris et al., "Unstructured Lumigraph Rendering", ACM, ACM SIGGRAPH, 2001, pp. 425-432.
Cao, Xun et al., "Semi-Automatic 2D-to-3D Conversion Using Disparity Propagation", IEEE, IEEE Transactions on Broadcasting, vol. 57, Issue 2, Apr. 19, 2011, pp. 491-499.
Chan, Shing-Chow et al., "An Object-Based Approach to Image/Video-Based Synthesis and Processing for 3-D and Multiview Televisions", IEEE, IEEE Transactions on Circuits and Systems for Video Technology, vol. 19, Issue 6, Mar. 16, 2009, pp. 821-831.
Chen, Shenchang E., "QuickTime VR—An Image-Based Approach to Virtual Environment Navigation", ACM, SIGGRAPH '95 Proceedings of the 22nd annual Conference on Computer graphics and interactive techniques, 1995, 29-38.
Cläre, Adam "Reality is a Game; What is Skybox?", retrieved from the Internet <http://www.realityisagame.com/archives/1776/what-is-a-skybox/>, Mar. 28, 2013, 5 pgs.
Davis, Abe et al., "Unstructured Light Fields", Blackwell Publishing, Computer Graphics Forum, vol. 31, Issue 2, Pt. 1, May 2012, pp. 305-314.
Extract all frames from video files, Video Help Forum, Oct. 2010, 3 pages.
Figueroa, Nadia, et al., "From Sense to Print: Towards Automatic 3D Printing from 3D Sensing Devices", IEEE, IEEE International Conference on Systems, Man, and Cybernetics (SMC, Oct. 13, 2013) 8 pages.
Fischler, Martin A.., et al., Random Sample Consensus: A Paradigm for Model Fitting with Applications to Image Analysis and Automated Cartography, ACM, Communications of the ACM, vol. 24, No. 6, Jun. 1981, 381-395 pgs.
Fitzgibbon, Andrew, "Automatic 3D Model Acquisition and Generation of New Images from Video Sequences", IEEE, 9th European Signal Processing Conference, Sep. 1998, 8 pgs.
Fusiello, Andrea et al., "View Synthesis from Uncalibrated Images Using Parallax", Proceedings of the 12th International Conference on Image Analysis and Processing, 2003, pp. 146-151.
Fusiello, Andrea, Specifying Virtual Cameras In Uncalibrated View Synthesis, IEEE Transactions on Circuits and Systems for Video Technology, vol. 17, No. 5, May 2007, 8 pages.
Gatys et al., "A Neural Algorithm of Artistic Style", Cornell University, arXiv:1508.06576v2 pp. 1-16. (Year: 2015).
Gibson, Simon, et al., Accurate Camera Calibration for Off-line, Video-Based Augmented Reality, IEEE, Proceedings of the International Symposium on Mixed and Augmented Reality (ISMAR'02) 10 pages.
Golovinskly, Aleksey et al., "Shape-based Recognition of 3D Point Clouds in Urban Environment", IEEE, IEEE 12th International Conference on Computer Vision (ICCV), 2009, 2154-2161.
Gurdan, Tobias et al., "Spatial and Temporal Interpolation of MultiView Image Sequences", Department of Computer Science, Technische Universität München Ascending Technologies GmbH, Krailing, Germany, Section 2.3, Image Warping and Blending; Retrieved from the Internet <https://vision.in.tum.de/ media/spezial/bib/gurdan-et-al-gcpr-2014.pdf>, 12 pages.
Haines, Russell, U.S. Appl. No. 62/380,914, Specification and Drawings, p. 1-24 (Year: 2016).
International Application Serial No. PCT/US19/28807 Preliminary Report on Patentability mailed Nov. 5, 2020, 9 pgs.
International Application Serial No. PCT/US19/30395, Preliminary Report on Patentability mailed Nov. 12, 2020, 7 pgs.
International Application Serial No. PCT/US19/58204, Preliminary Report on Patentability mailed May 14, 2021, 7 pgs.
International Application Serial No. PCT/US2016/042355, Search Report and Written Opinion mailed Oct. 19, 2016, 9 pgs.
Intl Application Serial No. PCT/US17/47684, Intl Preliminary Report on Patentability mailed Feb. 28, 2019, 7 pgs.
Intl Application Serial No. PCT/US17/47684, Intl Search Report and Written Opinion mailed Oct. 27, 2017, 8 pgs.
Intl Application Serial No. PCT/US17/47859, Intl Preliminary Report on Patentability mailed Feb. 28, 2019, 7 pgs.
Intl Application Serial No. PCT/US17/47859, Intl Search Report and Written Opinion mailed Nov. 2, 2017, 8 pgs.
Intl Application Serial No. PCT/US19/030395, Intl Search Report and Written Opinion mailed Sep. 2, 2019, 9 pgs.
Intl Application Serial No. PCT/US2014/065282, Search Report & Written Opinion mailed Feb. 23, 2015, 9 pgs.
Keller, Maik et al., "Real-Time 3D Reconstruction in Dynamic Scenes Using Point-Based Fusion", IEEE, 2013 International Conference on 3DTV, Jul. 1, 2013, 8 pages.
Klappstein, Jens, et al., Moving Object Segmentation Using Optical Flow and Depth Information, Springer, In: Wada T., Huang F., Lin S. (eds) Advances in Image and Video Technology. PSIVT 2009. LectureNotes in Computer Science, vol. 5414, 611-623 pgs.
Kottamasu, V. L. P. , "User Interaction of One-Dimensional Panoramic Images for iPod Touch", Thesis, Linkoping University Electronic Press, LIU-IDA-LITH-EX-A-12/071-SE, Dec. 4, 2012, 70 pages.
Li, Mingyang, Byung Hyung Kim, and Anastasius 1. Mourikis. "Real-time motion tracking on a cellphone using inertial sensing and a rolling-shutter camera." 2013 IEEE International Conference on Robotics and Automation. IEEE, 2013. (Year: 2013) 8 pages.
U.S. Appl. No. 15/963,896, Notice of Allowance mailed May 22, 2019, 8 pgs.
U.S. Appl. No. 15/963,896, Non Final Office Action mailed Apr. 18, 2019, 7 pgs.
International Application Serial No. PCT/US19/28807 Search Report and Written Opinion mailed Oct. 8, 2019, 12 pgs.
International Application Serial No. PCT/US2019/058204, Search Report and Written Opinion mailed Apr. 21, 2020, 10 pages.
Z. Cao et al., 'Realtime Multi-Person 2D Pose Estimation using Part Affinity Fields', In Proceedings of the IEEE Conference on Computer Vision and Pattern Recognition, Apr. 14, 2017, pp. 1-9 sections 2-3; and figure 2.
Bulat et al.; "Human pose estimation via convolutional part heatmap regression," In ECCV, 2016 (Year: 2016) 16 pages.
Zhe Cao et al., "Realtime Multi-person 2D Pose Estimation Using Part Affinity Fields", IEEE Conference on Computer Vision and Pattern Recognition (CVPR 2017), (Jul. 1, 2017), doi:10.1109/CVPR.2017.143, ISBN 978-1-5386-0457-1, pp. 1302-1310, XP055707263.
Communication pursuant to Article 94(3) issued in App. No. EP19877784, dated Jan. 3, 2024, 14 pages.
Milani, Patrizia, et al. "Mobile smartphone applications for body position measurement in rehabilitation: a review of goniometric tools." PM&R 6.11 (2014): 1038-1043.
"U.S. Appl. No. 15/409,500, Examiner Interview Summary mailed Mar. 5, 2019", 3 pages.
"U.S. Appl. No. 15/409,500, Non Final Office Action mailed Dec. 11, 2018", 11 pgs.
"U.S. Appl. No. 15/409,500, Notice of Allowance mailed Jun. 3, 2019", 8 pages.
"U.S. Appl. No. 15/601,863, Examiner Interview Summary mailed Nov. 21, 2018", 4 pgs.
"U.S. Appl. No. 15/601,863, Non Final Office Action mailed Sep. 20, 2018", 23 pages.
"U.S. Appl. No. 15/601,863, Notice of Allowance mailed Jan. 24, 2019", 8 pages.
"International Application Serial No. PCT/US16/52192, Intl Search Report and Written Opinion mailed Dec. 12, 2016", 8 pages.
"Intl Application Serial No. PCT/US16/52192, Intl Preliminary Report on Patentability mailed Apr. 5, 2018", 7 pgs.
U.S. Appl. No. 14/860,983, Final Rejection, Feb. 12, 2020, 18 pgs.

(56) References Cited

OTHER PUBLICATIONS

U.S. Appl. No. 15/620,506, Notice of Allowance and Fees Due (Ptol-85), Mar. 2, 2020, 10 pgs.
U.S. Appl. No. 15/632,709, Non-Final Rejection, May 22, 2020, 10 pgs.
U.S. Appl. No. 15/673,125, Final Rejection, Feb. 19, 2020, 17 pgs.
U.S. Appl. No. 15/713,406, Final Rejection, Feb. 19, 2020, 22 pgs.
U.S. Appl. No. 15/717,889, Non-Final Rejection, Oct. 27, 2020, 40 pgs.
U.S. Appl. No. 15/911,993, Non-Final Rejection, Aug. 5, 2020, 6 pgs.
U.S. Appl. No. 15/969,749, Final Rejection, Feb. 26, 2020, 15 pgs.
U.S. Appl. No. 15/969,749, Non-Final Rejection, Sep. 17, 2020, 15 pgs.
U.S. Appl. No. 16/179,746, Advisory Action (Ptol-303), Sep. 15, 2020, 2 pgs.
U.S. Appl. No. 16/179,746, Examiner Interview Summary Record (Ptol—413), Nov. 5, 2020, 2 pgs.
U.S. Appl. No. 16/362,547, Advisory Action (Ptol-303), Nov. 18, 2020, 2 pgs.
U.S. Appl. No. 16/362,547, Examiner Interview Summary Record (Ptol-413), Nov. 18, 2020, 1 pg.
U.S. Appl. No. 16/362,547, Final Rejection, Sep. 24, 2020,14 pgs.
U.S. Appl. No. 16/362,547, Examiner Interview Summary Record (Ptol-413), Nov. 5, 2020, 2 pgs.
U.S. Appl. No. 16/426,323, Notice of Allowance and Fees Due (Ptol-85), Aug. 5, 2020, 11 pgs.
U.S. Appl. No. 16/451,371, NOA—Notice of Allowance and Fees Due (Ptol-85), Sep. 17, 2020, 5 pgs.
U.S. Appl. No. 16/451,371, Non-Final Rejection, Jun. 11, 2020, 9 pgs.
U.S. Appl. No. 16/586,868, Notice of Allowance and Fees Due (Ptol-85), Jul. 31, 2020, 13 pgs.
U.S. Appl. No. 16/586,868, Notice of Allowance and Fees Due (Ptol-85), Oct. 7, 2020, 2 pgs.
U.S. Appl. No. 16/586,868, USPTO e-Office Action: CTNF—Non-Final Rejection, Dec. 20, 2019, 19 pgs.
U.S. Appl. No. 16/726,090, Non-Final Rejection, Nov. 19, 2020, 12 pgs.
U.S. Appl. No. 16/778,981, Non-Final Rejection, Oct. 13, 2020, 7 pgs.
U.S. Appl. No. 14/800,638, Non Final Office Action mailed Jul. 29, 2016, 11 pgs.
U.S. Appl. No. 12/101,883, Examiner Interview Summary mailed Sep. 6, 2016, 3 pgs.
U.S. Appl. No. 12/101,883, Examiner Interview Summary mailed Oct. 18, 2017, 2 pgs.
U.S. Appl. No. 13/464,588, Non Final Office Action mailed Aug. 2, 2019, 14 pgs.
U.S. Appl. No. 14/530,669, Advisory Action mailed Aug. 8, 2017, 5 pgs.
U.S. Appl. No. 14/530,669, Examiner Interview Summary mailed Apr. 14, 2017, 3 pgs.
U.S. Appl. No. 14/530,669, Examiner Interview Summary mailed Aug. 8, 2017, 2 pgs.
U.S. Appl. No. 14/530,669, Final Office Action mailed Apr. 20, 2017, 25 pgs.
U.S. Appl. No. 14/530,669, Non Final Office Action mailed Jan. 3, 2017, 26 pgs.
U.S. Appl. No. 14/530,671, Non Final Office Action mailed Jan. 3, 2017, 32 pgs.

\* cited by examiner

SCENE-AWARE SELECTION OF FILTERS AND EFFECTS FOR VISUAL DIGITAL MEDIA CONTENT

CROSS REFERENCE TO RELATED APPLICATIONS

This application is a continuation of and claims priority to U.S. patent application Ser. No. 15/427,030, filed Feb. 7, 2017, titled, "SCENE-AWARE SELECTION OF FILTERS AND EFFECTS FOR VISUAL DIGITAL MEDIA CONTENT," by Holzer, et al, which is hereby incorporated by reference in its entirety and for all purposes.

TECHNICAL FIELD

The present disclosure relates to the selection, recommendation, and application of filters and effects to visual digital media content.

DESCRIPTION OF RELATED ART

Visual digital media content is commonly modified by applying filters and effects. For example, a visual filter may sharpen, blur, or emboss an image to introduce a desired visual effect. However, current techniques are limited in their ability to modify complex digital media content such as video or multi-views. Further, users may face a large number of choices when attempting to select a particular filter or effect to apply to a digital media content item. Accordingly, it is desirable to develop improved mechanisms and processes relating to selecting filters and effects to apply to digital media content items.

Overview

Provided are various mechanisms and processes relating to the selection, recommendation, and application of filters and effects to visual digital media content.

In one aspect, which may include at least a portion of the subject matter of any of the preceding and/or following examples and aspects, a process implemented at a client device and/or embodied in a computer readable media includes analyzing a visual digital media item with a processor to identify one or more characteristics associated with the visual digital media item, where the characteristics include a physical object represented in the visual digital media item. Next, a visual digital media modification is selected from a plurality of visual digital media modifications based on the identified characteristics for application to the visual digital media item. Then, the selected visual digital media modification is provided for presentation in a user interface for selection by a user. The visual digital media item may be a video stream such as a live camera view captured via a camera. In some implementations, the visual digital media item includes a surround view of the object, where the surround view of the object includes spatial information, scale information, and a plurality of different viewpoint images of the object.

In another aspect, which may include at least a portion of the subject matter of any of the preceding and/or following examples and aspects, the characteristics may include structure information indicating a physical context in which the physical object is positioned, pose information indicating an attitude or position associated with the physical object, and/or movement information indicating a degree of velocity or acceleration of the object. The visual digital media modification may include a virtual object positioned within the visual digital media item, an artificial light source that appears to be blocked by the physical object in the visual digital media item, a change to the color of a portion of the visual digital media item, and/or motion blur indicating movement associated with the object. The object may be a human being, and the visual digital media modification may include a text bubble appearing in proximity to a face.

In yet another aspect, which may include at least a portion of the subject matter of any of the preceding and/or following examples and aspects, analyzing the visual digital media item may involve receiving the visual digital media item at a server via a network from a client device, where providing the visual digital media modification for presentation in a user interface includes transmitting a message via the network to the client device. In still another aspect, analyzing the visual digital media item may involve transmitting the visual digital media item to a server via a network from a client device and receiving a response message at the client device, the response message identifying the one or more characteristics.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
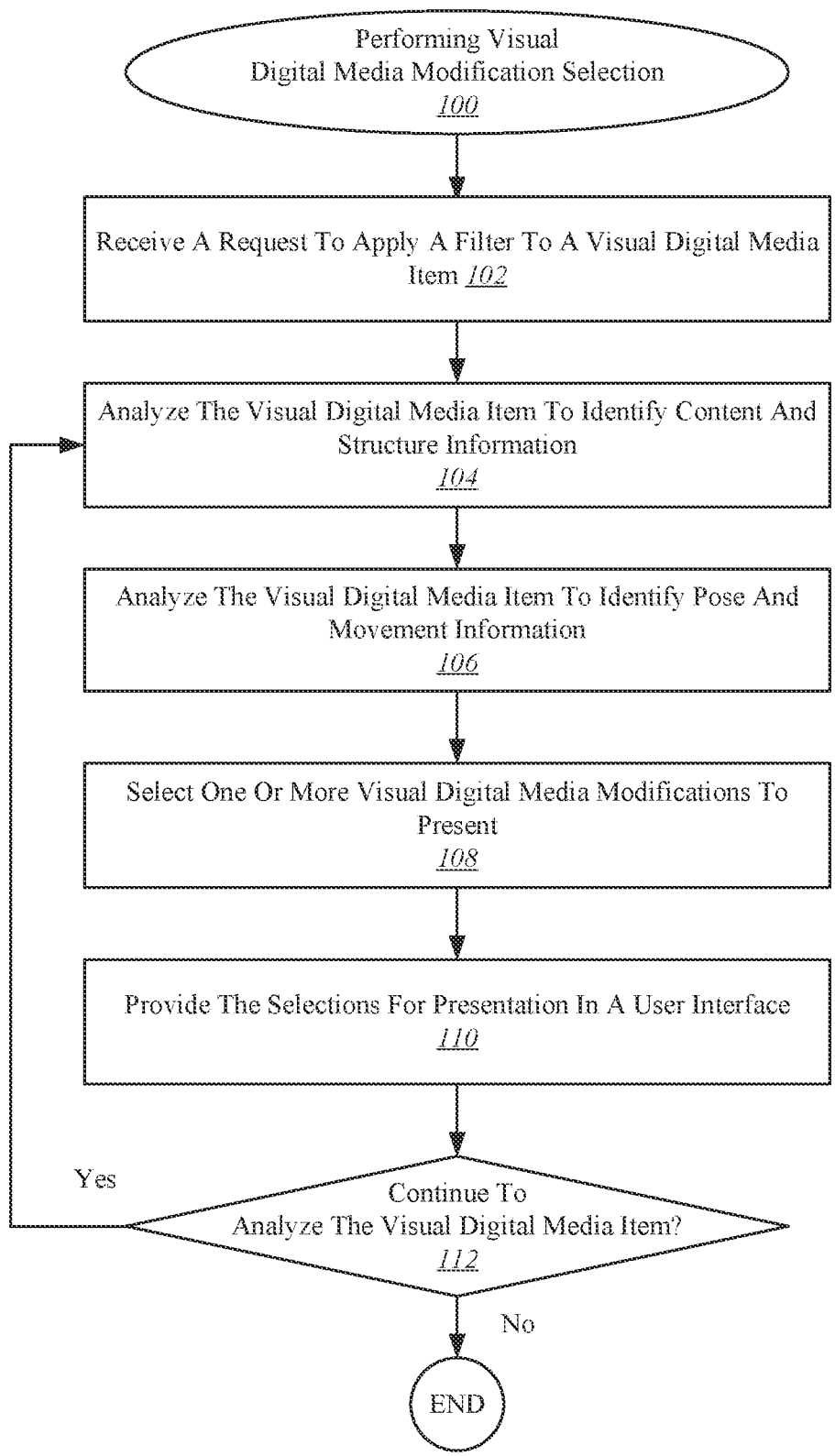
FIG. 1 illustrates one example of a process for performing visual digital media modification selection.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

According to various embodiments, improved mechanisms and processes are described for the selection, application, and recommendation of modifications to visual digital media items. Such modifications may include image filters, virtual objects, digital effects, or other such alterations. Such improved mechanisms and process allow a user to be presented with modifications that are specifically relevant to the content, structure, context, motion, and/or poses of a visual digital media item. In this way, a user may be presented with only the relevant modifications and need not manually sift through a large number of irrelevant modifications. Further, if modifications are applied in a way that reflects the modified visual digital media item, then the modifications may appear to be more realistic, and a larger number of modifications may be possible. Also, specific modifications may be applied to different parts of the same scene.

Digital media modifications, also referred to herein as filters, modify and/or add to the visual data of a visual digital media item such as a static image, a video stream, or a multi-view interactive digital media representation. According to various embodiments, filters can include any techniques for altering a visual digital media item. For example, a filter can alter the color information of the captured visual data by changing contrast, changing brightness, or applying a transformation to the underlying color matrix. As another example, a filter can add additional elements to the scene such as 2D or 3D stickers or text placed relative to an object in the visual digital media item, or any other such alteration. An artificial object can be placed relative to a two-dimensional object in two-dimensional space and/or relative to the three-dimensional reference coordinate system of a multi-view interactive digital media representation in three-dimensional space. The application of the filters can happen live (e.g., in a live media stream or a in a camera view) or in post-processing.

According to various embodiments, techniques and mechanisms described herein provide for improved user experience of a computer system. In many contexts, large set of different filters can be applied to visual digital media content. Due to the vast number of different filters that can be applied, conventional techniques require either a user to manually review a large number of filters to find the best filter for a certain use case, or application developers to limit the amount of filters the user can select from. Both options are suboptimal for the user. In contrast, techniques and mechanisms described herein allow a user to be presented with filters specifically relevant to the user's content.

With reference FIG. 1, shown is one example of a process for performing visual digital media modification selection. In some implementations, the process 100 may be performed at a client device. Alternately, the process 100 may be performed at a server. In yet another implementation, some operations shown in the process 100 may be performed at client device while other operations are performed at a server in communication with the client device. In particular embodiments, the client device and the server may be implemented as different processes running on the same physical device. In other embodiments, the client device and the server may be implemented on different physical devices in communication via a network.

According to various embodiments, the process 100 begins when a request to apply a filter to a visual digital media item is received at 102. The request may be received when a user specifically requests to apply a filter to a visual digital media item. Alternately, the request may be generated automatically when triggered by a particular action such as the activation of a camera at a client device.

Next, at 104, the visual digital media item is analyzed to identify content and structure information. According to various embodiments, content information may include any indication of objects represented in the visual digital media item. For instance, the identified content may include a human being, an animal, a plant, text, an inanimate object such as a vehicle, or an abstract shape such as a ball. Structure information may include a ground plane or a wall. Semantic areas such as sky, grass, and water may also be identified.

Then, at 106, the visual digital media item is analyzed to identify pose and movement information. In some implementations, pose information may indicate an attitude or position of an identified object. For example, if a human being is identified as being represented in the visual digital media item, then pose information may indicate whether the human being is sitting, standing, walking, or arranged in some other posture. Pose information may also be applied to other types of objects. For instance, pose information may indicate the position of a vehicle relative to the viewer, the stance of an animal, the attitude or position of a deformable inanimate object, or other such positioning information. Movement information may indicate the velocity or acceleration of an identified object. The movement may be identified relative to scene structure, another object, the viewpoint, or any other reference plane or point.

A variety of techniques may be used to identify content, structure, pose, and movement information. Identifying such information may involve applying a content recognition algorithm to visual media. For instance, a recognition algorithm may be applied to an image, a video frame, one or more images in a multi-view of an object, or a stream of video frames. The specific techniques used to identify content, structure, pose, and movement information may depend on the particular implementation. For instance, different techniques may be used based on characteristics of the visual digital media item or the identify content, structure, pose, or movement information to be identified.

After analyzing the visual digital media item, one or more visual digital media modifications to present are selected at 108. According to various embodiments, one or more specific filters may be selected based on the content and/or context of the scene depicted in the visual digital media content. That is, the identification of objects such as cars, food or people, or the identification of semantic areas such as sky, grass, water may trigger the selection, recommendation, and/or application of specific filters. For example, if a car is present in the captured scene and is detected, then car-specific filters such as stickers, exhaust fumes, and other types of augmented reality modifications may be made available. As another example, if a person is present in the scene then filters specific for humans may be added, such as speech bubbles. As still another example, filters may be selected that apply to particular contexts, such as fashion shots or sporting events. For some objects, such as people and vehicles, poses and movements may also be used to trigger filters. If multiple objects are present, such as both a person and a vehicle, then filters may be selected that are specific to the combination of objects, instead of or in addition to filters that are specific to only persons or only vehicles.

In particular embodiments, selected filters may be applied automatically to the visual digital media modification. For example, the server may transmit an instruction to the client machine to apply one or more selected filters. Alternately, or additionally, one or more filters may be provided for manual selection by a user in a user interface. For instance, the server may transmit an instruction to the client machine identifying one or more filters to present.

In some implementations, one or more of a variety of context-specific filters may be selected. In one example, certain filters may be selected for certain objects. For instance, vehicles may be modified to include stickers, color changes, motion blur, or other such vehicle-specific alterations. In a second example, moving artificial objects may be added that react with the scene structure such as balls that bounce off of the ground, objects that accumulate on the ground, weather patterns such as rain or snow that interact with the scenery, artificial light sources that are blocked by objects in the scene, or other such alterations. In a third example, an artificial object may be automatically positioned relative to the scene and/or objects. Specific examples of inserting virtual objects include, but are not limited to: 3D text bubbles appearing next to a human's face, "vroom" text appearing near a car's engine, or hats or clothing being placed on humans or animals. In a fourth example, a filter may change the color of the sky or alter the "style" of a visual digital media item. For instance, the style may be altered to appear cartoonish or retro.

In some embodiments, effects and filters may be added based on a detected pose. In one example, if a person is detected in a particular pose, then a filter may be selected that will cause a laser beam or fire to shoot from the person's hands. In a second example, if multiple people are detected close to one another, then effects or elements which correlate both people can be added, such as hearts indicating affection. In a third example, if a person is detected, then the person can be cut out of the scene and pasted in one or more times in a different position or pose, such as dancing. In a fourth example, parts of a human body can be replaced. For instance, a head may be replaced with an apple, a crocodile head, or some other object. In a fifth example, the context can be changed. For instance, when a person is detected as jumping, a filter may be applied to depict alligators or some other hazard beneath the person. In a sixth example, elements can be added that interact with a person. For instance, a snake can be added that moves up a person's body, or lightning can be added that traverses a person's body. An infinite variety of such alterations is possible. In a seventh example, a person may be cut or copied from a scene and then pasted back into the same scene one or more times in the same pose but a different position. For instance, a single dancing person may be copied multiple times in the same pose to create a crowd of dancing people.

In particular embodiments, analyzing the visual digital media item may involve transmitting some or all of the visual digital media item to a server for processing. The server may then process the visual digital media item and response with one or more recommend digital media modifications. Techniques for client-server interactions are discussed in greater detail with respect to FIGS. 4, 5, and 6.

According to various embodiments, visual digital media modifications may be selected based at least in part on explicit classifications or categorizations. For instance, a user or system administrator may specifically identify a particular type of modification as pertaining to a vehicle, a person, or both. Alternately, or additionally, visual digital media modifications may be selected based at least in part on implicit or machine-generated classifications or categorizations. For instance, the system may analyze user selections to help determine which modifications to suggest for which visual digital media items. Additional details regarding machine classification are discussed with respect to FIG. 2.

Once the one or more visual digital media modifications are selected, at 110 the selections are provided for presentation in a user interface. According to various embodiments, the specific technique for providing the selections for presentation may depend in part on the specific implementation. For instance, if the analysis is performed at a server, then providing the selections for presentation may involve transmitting a message to a client device with instructions for presenting the selections in a user interface at the client device. Alternately, if the analysis is performed at a client device, then the selections may be presented directly in a user interface.

Then, a determination is made at 112 as to whether to continue to analyze the visual digital media item. According to various embodiments, analysis may continue until one or more conditions or criteria are met. These may include, but are not limited to: the receipt of user input indicating a request to stop analysis, the selection of a particular filter or filters for presentation, and the termination of a live or prerecorded media stream.

Figure 2:
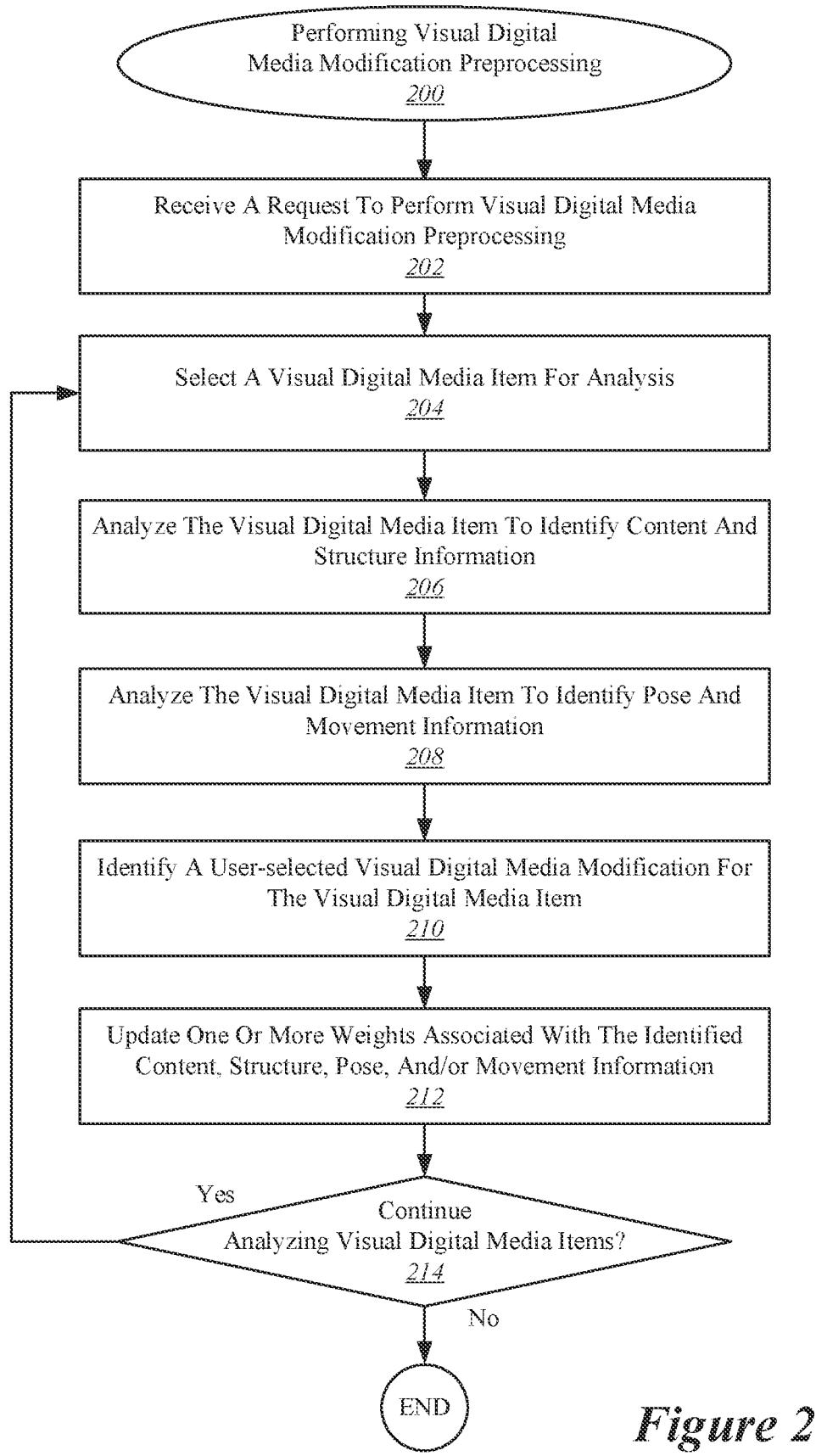
FIG. 2 illustrates one example of a process for performing visual digital media modification preprocessing.

With reference FIG. 2, shown is one example of a process for performing visual digital media modification preprocessing. According to various embodiments, the procedure 200 may be performed in order to help determine which visual digital media modifications to suggest for which visual digital media items. To accomplish this, user-selections of filters may be analyzed to identify characteristics likely to make particular filters attractive in specific situations. The procedure 200 may be performed at a server having access to a wide range of user selections or at a client machine. The procedure 200 may be initiated when a request is received at 202 to perform visual digital media modification preprocessing. According to various embodiments, the request may be generated automatically (for instance periodically) or manually (for instance by a system administrator).

Next, a visual digital media item is selected for analysis at 204. In some implementations, a visual digital media item may be selected for analysis when it is associated with user-provided input indicating a selection of a filter for application to the item. In one example, all filtered visual digital media items may be selected for analysis in some sequence. Alternately, a subset of the available data may be analyzed. For instance, a designated number of filtered visual digital media items may be selected in a particular category, such as filtered visual digital media items that include people, vehicles, or animals. Once a visual digital media item is selected for analysis, it is analyzed at 206 to identify content and structure information and at 208 to identify pose and movement information. These analyses may be substantially similar to the operations 104 and 106 discussed with respect to FIG. 1.

After the visual digital media item is analyzed, one or more user-selected visual digital media modification is identified at 210. For instance, a user initially viewing the media item may have been presented with a set of filters to choose from and then selected a particular filter to apply to the media item. The user's choice may then have been recorded for further analysis. At 212, one or more weights associated with the identified content, structure, pose, and/or movement information is updated.

According to various embodiments, updating the one or more weights may involve indicating a connection between a characteristic of the media item and the selected filter. In one example, a particular filter is identified as having been applied to a particular visual digital media item that analysis reveals to include a moving car, stationary flowers, and a walking dog. In this example, the weights linking the particular filter to each of these characteristics are increased. For instance, if the filter includes flames that shoot in a particular direction, then users may be more likely to apply the filter to moving cars. Over time, the weight linking the filter to the media item characteristic of a moving car may be increased so that eventually the system may automatically recommend the shooting flames filter when the media item includes a car without needing a human to explicitly flag the filter as being specific to vehicles.

Next, a determination is made at 214 as to whether to continue to analyze visual digital media items. According to various embodiments, analysis may continue until one or more conditions or criteria are met. These may include, but are not limited to: the receipt of user input indicating a request to stop analysis, the selection of a particular set of weights, and the analysis of all available user selections.

Figure 3:
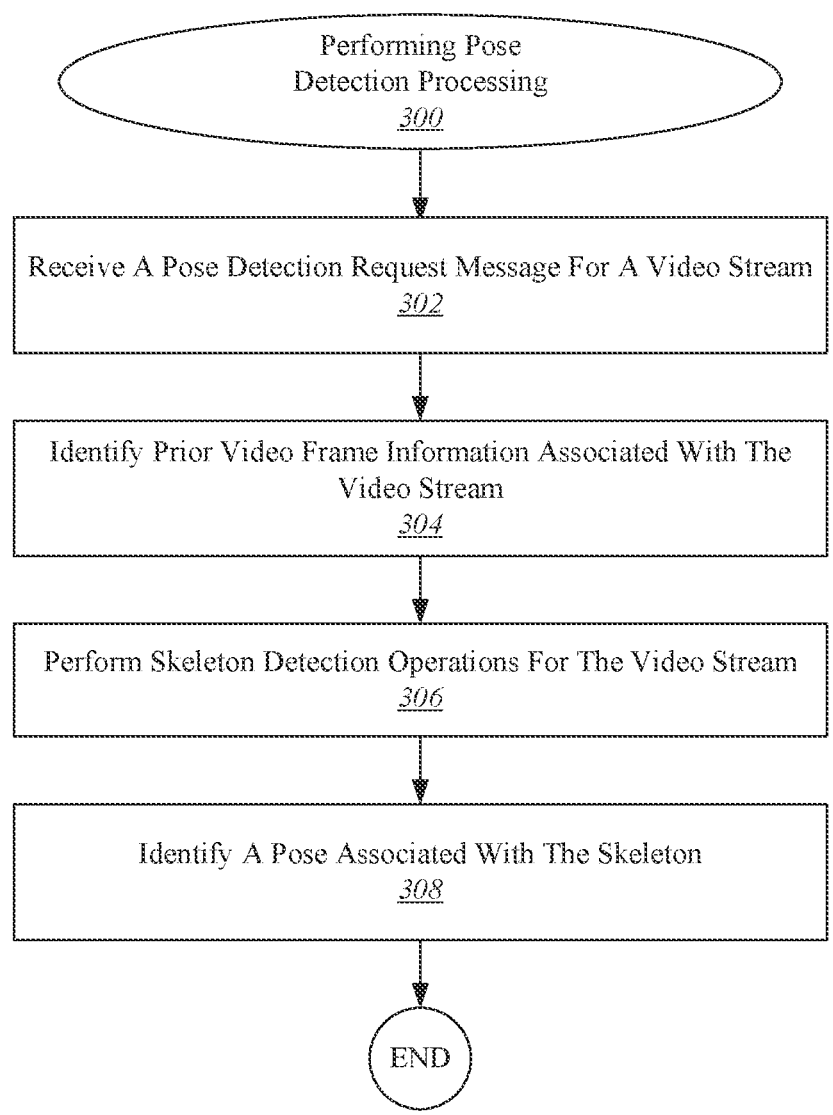
FIG. 3 illustrates one example of a process for performing pose detection for an object.

FIG. 3 illustrates one example of a process for performing pose detection for an object. According to various embodiments, pose detection may be used for any of various purposes. In one example, pose detection may be used to trigger a filter. For instance, pose detection may be used to determine if a person is exhibiting a particular pose, such as pumping a first in the air. If such a pose is detected, then the video stream may be altered to depict lightning extending from the fist. In another example, skeleton detection may be used to trigger a photo to be captured. For instance, a person may position a camera to take a self-image and then move in front of the camera. The camera may then capture an image when it identifies the person's skeleton and determines that the person has stopped moving or has entered into a particular pose, such as jumping in the air. The procedure 300 is initiated when a request is received at 302 to perform pose detection for a video stream.

Then, at 304, prior video frame information associated with the video stream is identified. At 306 skeleton detection operations for the video stream are performed. According to various embodiments, skeleton detection operations may be performed using any of various suitable methods. In one example, a convolutional neural network may be applied to an image to first detect all objects in the scene and then estimate the skeleton joints for those that belong to the "person" category. In a second example, static skeleton detection at the server may be combined with server-side skeleton detection and/or tracking across prior frames. For instance, the results of one or more skeleton detection operations for previous skeleton detection messages may be analyzed to aid in the detection of a skeleton for the current frame. In a third example, non-visual data such as accelerometer or gyroscopic data may be analyzed to aid in skeleton detection.

After performing skeleton detection, at 308 pose detection is performed. In pose detection, the detected human skeleton may be used to determine whether the arrangement of the skeleton at a particular point in time matches one or more of a discrete set of human poses. In some implementations, pose detection may be accomplished by first estimating a homography from the skeleton joints that in order to frontalize the skeleton for a bitter pose. Then, pose detection may be performed by analyzing spatial relations of the frontalized joints. Next, a temporal filtering method may be applied to remove spurious detections. In particular embodiments, such techniques may be applied to detect poses for either individuals or for multiple people.

In some embodiments, pose detection may involves scaling or stretching location information associated with the detected skeleton and then comparing the location information with the predetermined location information associated with specific poses, where a high degree of similarity between the detected skeleton information and the predetermined skeleton pose information would indicate a match. When pose detection is used, different poses may trigger different events, such as the application of specific filters to a video stream. Alternately, or additionally, the detection of a specific pose may trigger the recommendation of one or more filters to the user for the user to select. In either case, pose detection may be used to suggest or identify start and/or end times for an effect as well as the type of effect that could be added.

Figure 4:
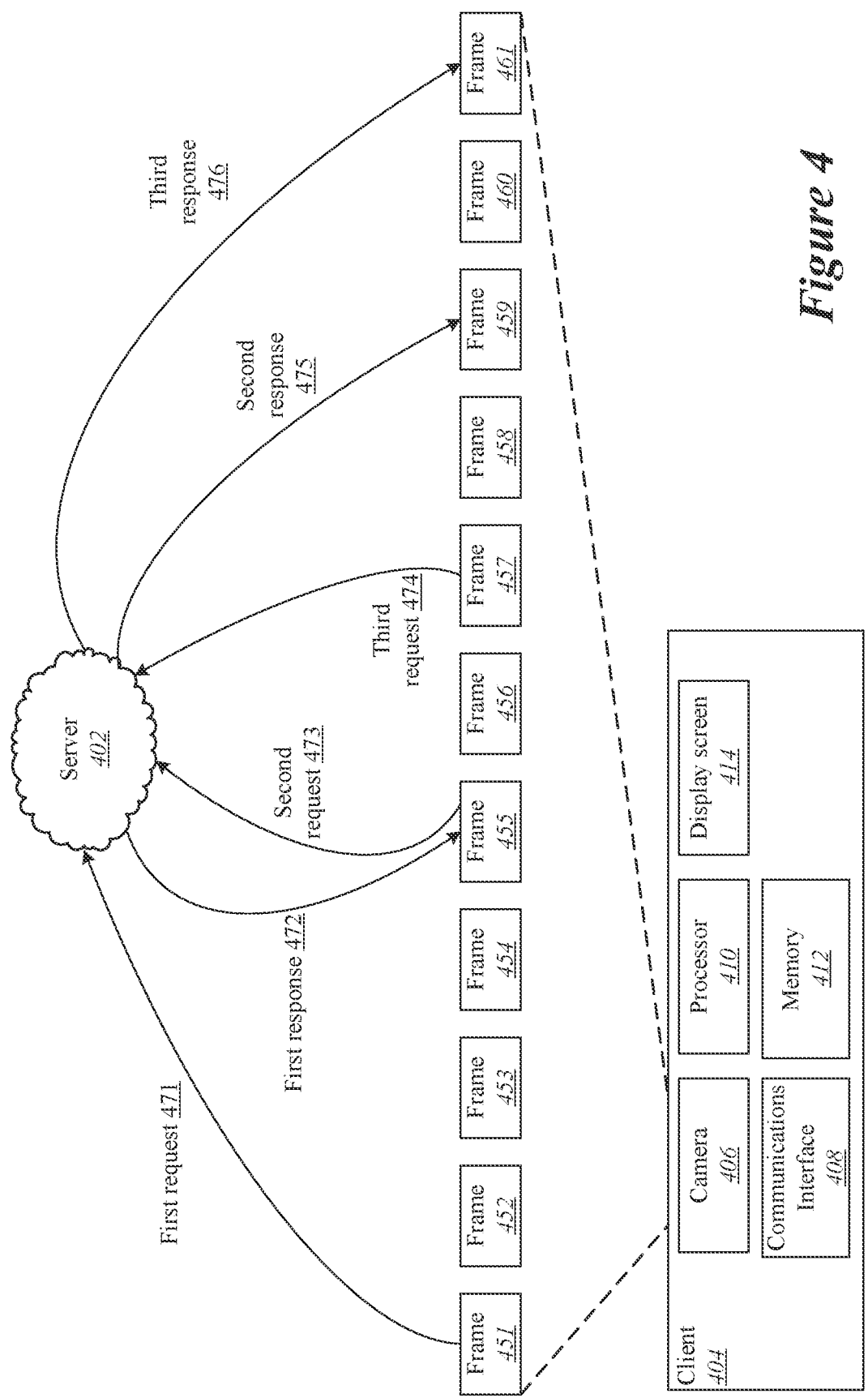
FIG. 4 illustrates one example of a system that can be used to perform live video stream filtering.

With reference to FIG. 4, shown is one example of a system that can be used to perform a live video stream filtering. As depicted, a combination of client and server applications is used to implement a filtering mechanism that runs live in a capture device application, such as with a camera on a smartphone. While the camera is recording, the user points the camera at an object. The smartphone then communicates with the server, and collectively the two devices analyze the video stream to provide a filtered view of the video stream in real time.

In the present embodiment, the client is depicted as device 404, which can be a capture device such as a digital camera, smartphone, mobile device, etc. The server is depicted as system 402, which receives images selected from the video stream at the client device. The video stream at the client device is divided into video frames 451 through 461. The server processes the frames sent from the client device and response with filtering information that can be used to apply a filter to the video stream at the client device. The client device includes a camera 406 for capturing a video stream, a communications interface 408 capable of communicating with the server, a processor 400, memory 402, and a display screen 404 on which the video stream may be presented.

According to various embodiments, the client and server may coordinate to apply a filter to the video stream at least in part due to limited computing resources at the client machine. However, as discussed herein, the network latency and processing time involved in transmitting video frames to the server means that the video stream at the client device has progressed to a new video frame before receiving the filter processing message from the server with the filter information associated with the preceding frame. For instance, in FIG. 4, the first request 471 transmits the frame 451 to the server, while the first response 472 corresponding to the frame 451 arrives while the frame 455 is being processed. Similarly, the second request 473 and third request 474 transmit frames 455 and 457 respectively, but the corresponding second and third responses 475 and 476 are not received until the video stream has arrived at frames 459 and 461 respectively.

In some implementations, the client application sends (and also receives) data in a sparse manner, meaning that data is sent to the server potentially not for all frames captured by the camera. Therefore, in order to present a filtered result for a live stream, the information received from the server is tracked or propagated to new frames received from the camera until new information from the server is available. For example, in FIG. 4, the client device may propagate information received in the first response 472 through frames 456, 457, and 458 until the second response 475 is received for the processing of frame 459.

Figure 5:
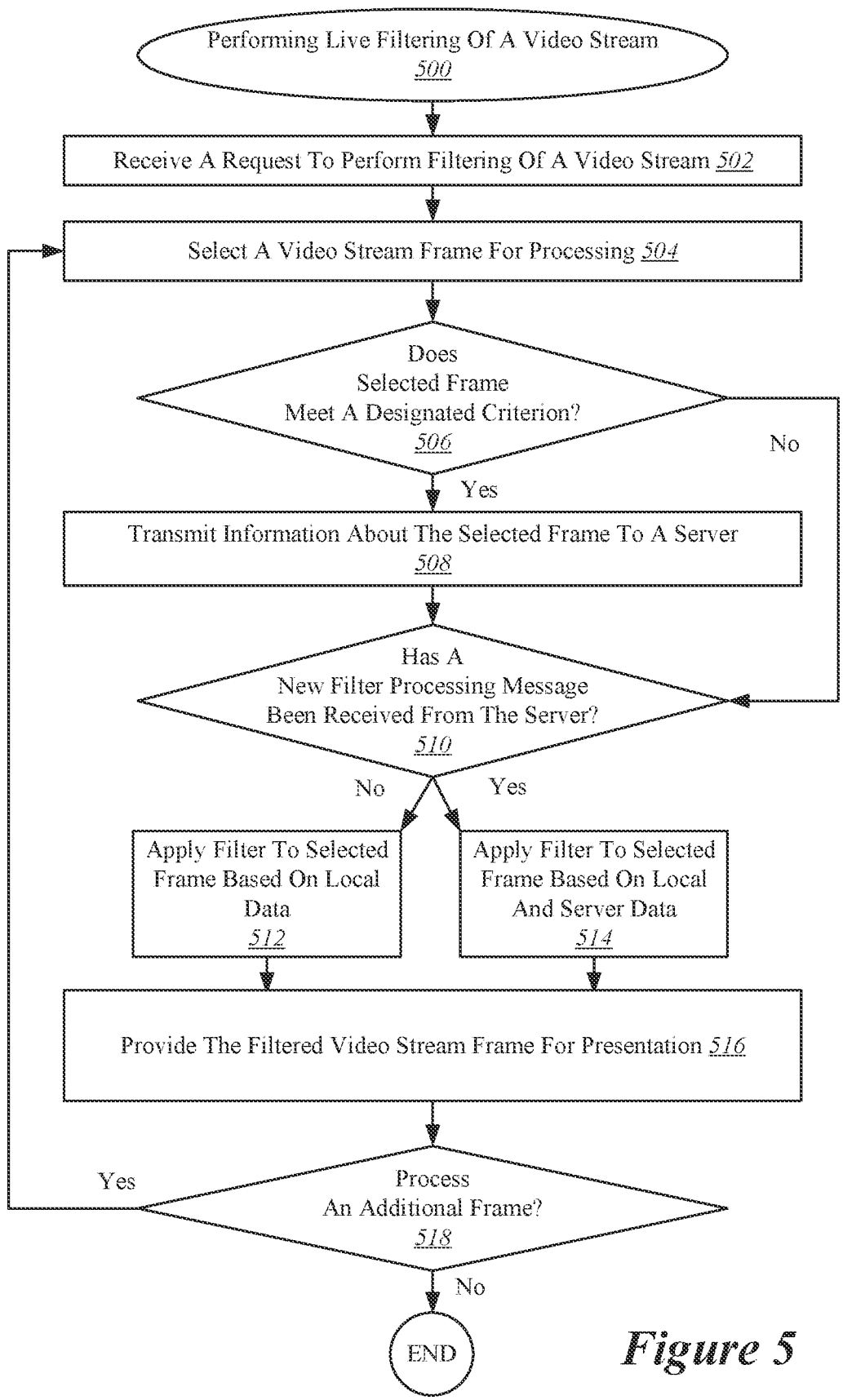
FIG. 5 illustrates one example of a process for performing live filtering of a video stream.

With reference to FIG. 5, shown is one example of a process for performing live filtering of a video stream. According to various embodiments, the process shown in FIG. 5 may be performed at a client machine in communication with a server, such as the client machine 104 in communication with the server 105 shown in FIG. 1. The two devices may coordinate to split the processing operations required to apply a filter to a live video stream.

In the present example, a live filtering process 500 begins with the client device receiving a request to perform filtering of a video stream at 502. In some implementations, the request may be generated based on user input requesting the application of a filter. Alternately, the request may be generated automatically when the client device detects that a video stream is being captured or displayed at the client device. Next, the system select a video stream frame for processing at 504. According to various embodiments, video stream frames may be processed sequentially. For instance, each frame in a live video stream may be processed prior to presenting the video stream to the user so that a filter may be applied.

At 506, a determination is made as to whether the selected video stream frame meets a designated criterion. In some implementations, any of a variety of criteria may be used to select a video stream frame for transmission to the server. For example, if the filtering process has just been initiated, then the client device may select the first available video stream frame for processing. As another example, one or more criteria may be applied to select the video stream frame. For instance, the client device may select a video stream frame that exceeds a threshold level of light or detail to allow for sufficient information for applying a filter. As yet another example, the client device may select a video stream frame for processing after a designated period of time or number of frames have passed since the last video stream frame was transmitted to the server.

If the selected frame meets the designated criterion, then information about the selected frame is transmitted to the server at 508. According to various embodiments, a variety of information may be transmitted to the server. In one example, some or all of the image data associated with the frame may be transmitted. For instance, the entire frame may be transmitted. Alternately, the frame may be compressed or down sampled to reduce bandwidth usage. In a second example, IMU information such as gyroscopic data, compass data, or accelerometer data may be transmitted. This IMU information may provide data about the position, velocity, acceleration, direction, rotation, or other such characteristics of the device around the time that the frame was captured. In a third example, GPS information may be transmitted. In some implementations, the specific information transmitted to the server may depend on the type of processing being performed at the server and/or the type of filter being applied at the client device.

Next, a determination is made at 510 as to whether a new filter processing message has been received from the server. As shown in FIG. 1, the server sends messages that include information for applying filters to frames, but these filter processing messages are sent at a lag when compared with the live processing and presentation of the video stream.

If no new filter processing message has been received, then at 512 a filter is applied based on existing data that is locally available at the client machine. In some embodiments, applying a filter based on locally available data may involve propagating information from one frame to another. For instance, a current frame may be analyzed to identify the same feature (e.g., an object corner or an area of color) that was identified in the preceding frame. According to various embodiments, a multitude of approaches can be used to propagate information from one frame to another. One such approach is frame-to-frame tracking, which can be based on information that may include, but is not limited to: tracking of sparse keypoints, dense or sparse optical flow, patch tracking, tracking of geometric instances, or other such information. Another such approach is frame-to-frame matching, which involve techniques that may include, but are not limited to: descriptor based matching of keypoints which are detected in both frames, patch matching, detection and matching of higher level features (e.g. a human face), or other such techniques. Both approaches can focus the tracking and matching efforts on regions or features of interest if such regions or features are identified.

In some implementations, a special processing cases the time from the first frame that is sent to the server to the frame when the corresponding results are received back from the server. Since there is no server-created scene interpretation available until the results of the first frame are received, the client device may not know which specific information in the scene needs to be propagated. Various approaches are possible for handling this situation. In one example, all or most information in the frame is equally propagated. For instance, keypoints may be distributed over the whole image. In a second example, an efficient method for estimating one or more regions of interest may be applied on the client device. For instance, a bounding box for the region may be computed. Then, the propagation of information may be concentrated on the region or regions of interest. In a third example, matching methods may be applied to directly match the information extracted from the first frame to the frame after which the results from the server are available.

If instead a new filter processing message has been received, then at 514 a filter is applied based on both the locally available data and the data provided by the server. According to various embodiments, new information received from the server may be combined with the information propagated from frame to frame. To accomplish this goal, various approaches may be used. In one example, old information may be replaced with new information received from the server. In a second example, old information may be combined with new information in a weighted fashion, for instance based on relative confidence values associated with server results and propagation results.

According to various embodiments, the specific operations performed to apply a filter may depend in large part upon the specific type of filter being applied. In one example, a caption bubble may be applied to a video of a person when the person exhibits a particular pose. In this first example, the server may perform skeleton detection to facilitate pose estimation while the client device tracks low-level image features such as a point associated with a person's elbow or a surface area that is part of the background. Then, the client device may combine the low-level feature tracking information with the skeleton detection information provided by the server to determine whether the person is positioned in the particular pose. In a second example, a filter may be applied to a vehicle based on its position (e.g., crossing a finish line). In this second example, the server may perform segmentation to identify the segmentation and characteristics of the vehicle, while the client device tracks low-level features such as shapes to propagate the location of the vehicle between communication with the server.

After applying the filter to the selected frame, the filtered frame is provided for presentation at 516. In some implementations, providing the filtered frame for presentation may involve displaying the filtered frame as part of the video stream on a display screen. Alternately, or additionally, the filtered frame may be stored to memory and or persistent storage for later playback. In a different example, the filtered frame may be transmitted to a separate device for presentation, such as an augmented reality or virtual reality device in communication with the client device. Finally, at 518 a determination is made as to whether to process an addition frame. According to various embodiments, additional frames may be processed until any of a variety of conditions are met. These conditions may include, but are not limited to: receiving user input indicating a request to terminate live filtering, determining that the video stream has terminated, or determining that the server is inaccessible via the network.

Figure 6:
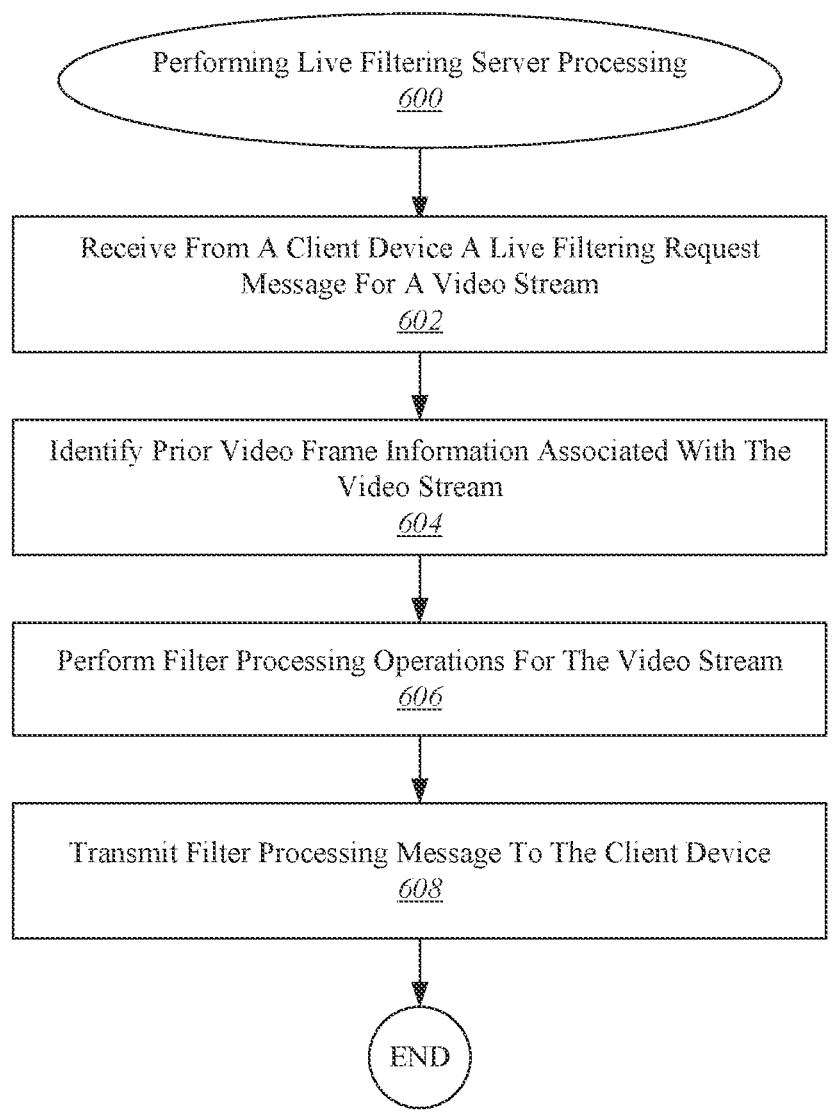
FIG. 6 illustrates one example of a process for performing live filter processing of a video stream at a server.

With reference to FIG. 6, shown is one example of a configuration for performing live filtering server processing. In some implementations, the procedure 600 may be performed in order to perform server-side processing to facilitate the live filtering of a media stream at a client device. The procedure 600 may be initiated at 602 when a live filtering request message for a video stream is received from a client device. According to various embodiments, as discussed with respect to FIGS. 1 and 2, a variety of information may be included in a live filtering request message. For instance, the request message may include the identity of the client device as well as any information necessary for performing live filtering, such as image data information associated with one or more video stream frames, IMU information, or GPS information.

In particular embodiments, after receiving the request message, at 604 the server may identify information associated with one or more prior video frames in the video stream. For example, the prior video frame information may include any raw data transmitted from the client device in early live filtering request messages. Alternately, or additionally, the prior video frame information may include processed or filtered data generated by processing previous live filtering request messages.

Then, at 606 the server performs filter processing operations for the video stream. The specific filter processing operations performed may depend in large part on the particular type of filter being applied to the video stream. Some examples of processing operations running on the server may include, but are not limited to: detection, segmentation, and pose estimation. Such methods may be applied to objects that include, but are not limited to: humans, animals, vehicles, inanimate objects, and plants. Other examples of methods running on the server may include, but are not limited to: depth estimation, scene reconstruction, scene decomposition, and semantic labeling.

According to various embodiments, the filter processing operations may generate a wide range of information. For example, the filter processing operations may generate location information that identifies locations of high-level features such as faces or skeleton components on image data sent from the client device. As another example, the filter processing operations may include or identify virtual elements to overlay on top of the video stream at the client device. For instance, the filter processing operation may identify the video stream as including footage of a running dog and then indicate as one filter possibility a cape that could be overlain on the moving image of the dog to generate a visual effect of a "super dog." As yet another example, the filter processing operations may include semantic elements such as labels for recognized objects or words generated by applying optical character recognition to text in the video stream.

After performing the filter processing operations, at 608 a filter processing message is transmitted to the client device. According to various embodiments, the filter processing message may include any suitable information, including location information identifying the location of features in the scene, semantic information that identifies the meaning of particular elements in the scene, or data for overlaying virtual elements on top of the scene.

Figure 7:
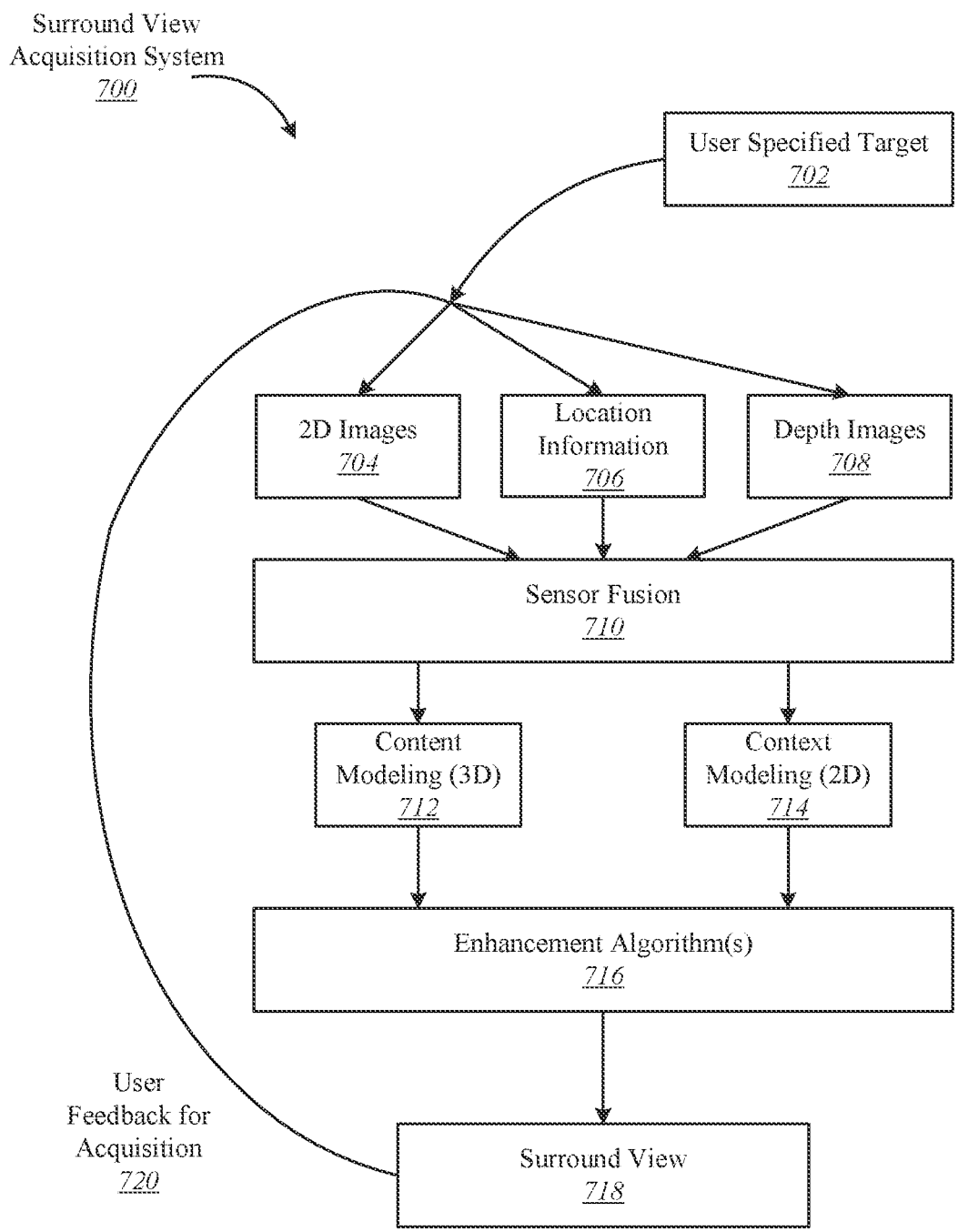
FIG. 7 illustrates an example of a surround view acquisition system.

With reference to FIG. 7, shown is an example of a surround view acquisition system that can be used to generate a multi-view interactive digital media representation that can be used for the application of filters or visual effects. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 700 is depicted in a flow sequence that can be used to generate a surround view. According to various embodiments, the data used to generate a surround view can come from a variety of sources. In particular, data such as, but not limited to two-dimensional (2D) images 704 can be used to generate a surround view. These 2D images can include color image data streams such as multiple image sequences, video data, etc., or multiple images in any of various formats for images, depending on the application. Another source of data that can be used to generate a surround view includes location information 706. This location information 706 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images 708. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 710. In some embodiments, a surround view can be generated a combination of data that includes both 2D images 704 and location information 706, without any depth images 708 provided. In other embodiments, depth images 708 and location information 706 can be used together at sensor fusion block 710. Various combinations of image data can be used with location information at 706, depending on the application and available data.

In the present example embodiment, the data that has been fused together at sensor fusion block 710 is then used for content modeling 711 and context modeling 714. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 711 and context modeling 714 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 702 can be chosen. It should be noted, however, that a surround view can be generated without a user specified target in some applications.

In the present example embodiment, one or more enhancement algorithms can be applied at enhancement algorithm(s) block 716. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 716. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 718 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in applying filters or visual effects.

According to various example embodiments, once a surround view 718 is generated, user feedback for acquisition 720 of additional image data can be provided. In particular, if a surround view is determined to need additional views to provide a more accurate model of the content or context, a user may be prompted to provide additional views. Once these additional views are received by the surround view acquisition system 700, these additional views can be processed by the system 700 and incorporated into the surround view.

Figure 8:
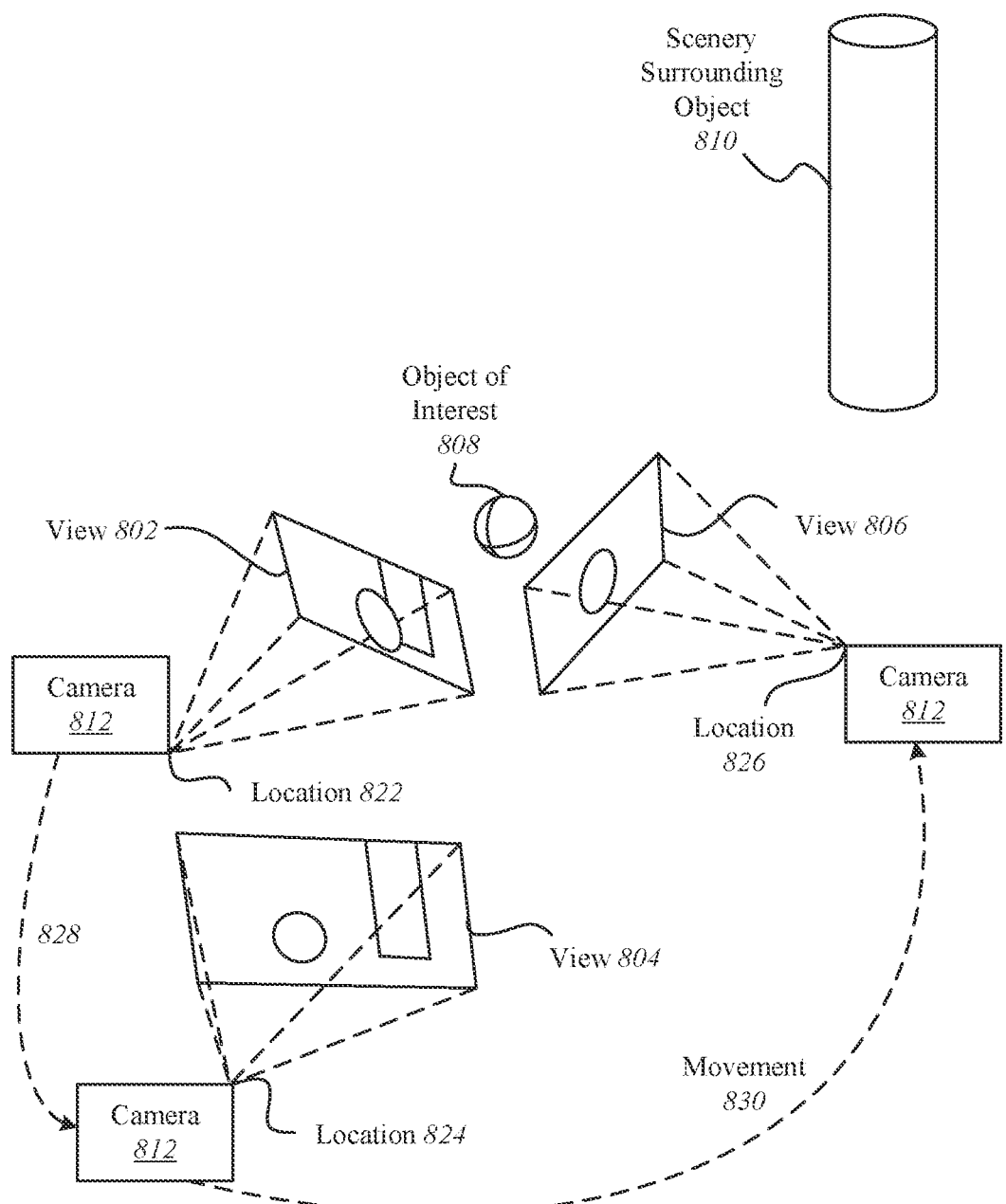
FIG. 8 illustrates an example of a device capturing multiple views of an object of interest.

With reference to FIG. 8, shown is an example of a device capturing multiple views of an object of interest from different locations. The capture device is indicated as camera 811, and moves from location 822 to location 824 and from location 824 to location 826. The multiple camera views 802, 804, and 806 captured by camera 811 can be fused together into a three-dimensional (3D) model. According to various embodiments, multiple images can be captured from various viewpoints and fused together to provide a multi-view digital media representation.

In the present example embodiment, camera 811 moves to locations 822, 824, and 826, respectively, along paths 828 and 830, in proximity to an object of interest 808. Scenery can surround the object of interest 808 such as object 88. Views 802, 804, and 806 are captured by camera 811 from locations 822, 824, and 826 and include overlapping subject matter. Specifically, each view 802, 804, and 806 includes the object of interest 808 and varying degrees of visibility of the scenery surrounding the object 810. For instance, view 802 includes a view of the object of interest 808 in front of the cylinder that is part of the scenery surrounding the object 808. View 804 shows the object of interest 808 to one side of the cylinder, and view 806 shows the object of interest without any view of the cylinder.

In the present example embodiment, the various views 802, 804, and 806 along with their associated locations 822, 824, and 826, respectively, provide a rich source of information about object of interest 808 and the surrounding context that can be used to produce a multi-view digital media representation, such as a surround view. For instance, when analyzed together, the various views 802, 804, and 806 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 808 into content and the scenery 88 as the context. In particular examples, the content can then be used for applying filters.

Figure 9:
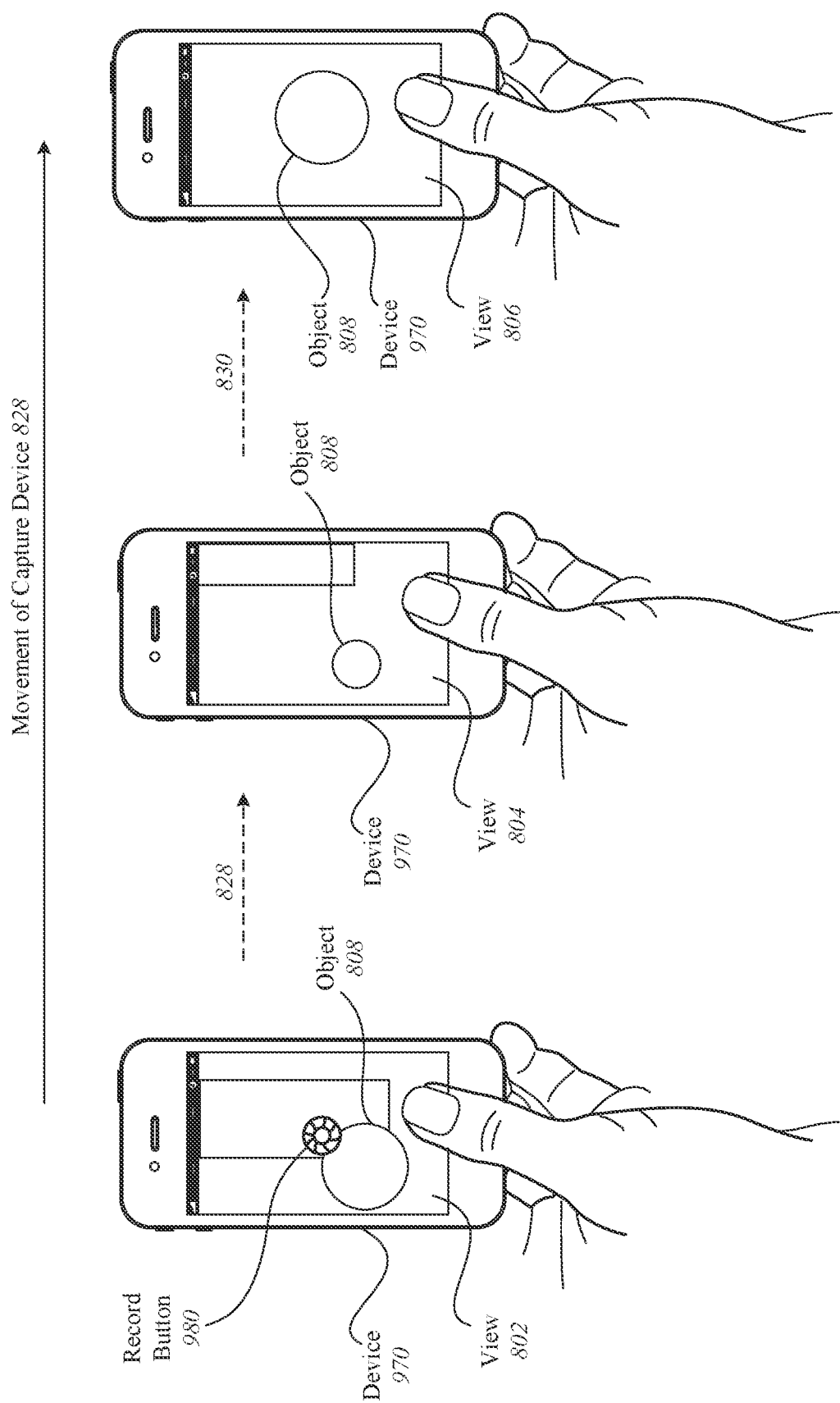
FIG. 9 illustrates an example of a device capturing views of an object of interest to create a multi-view media representation to which a filter may be applied.

With reference to FIG. 9, shown is an example of a device capturing views of an object of interest. During a filter session, multiple views of the object 908 may be captured by the device 970 from different locations. In the present example, data is acquired when a user taps a record button 980 on capture device 970 to begin recording images of the object.

The user moves 828 the capture device 970 from location 822 to location 824 along path 828 and from location 824 to location 826 along path 830. As described in more detail throughout this application, filtering can be provided at the device 970, and prompts for the user to capture particular views can be provided during the session. In particular, the system can prompt the user to move the device 970 in a particular direction or may prompt the user to provide additional information. As the user records different views of the object, filtering suggestions may be reiteratively refined to provide accurate results. The user may choose to stop recording by tapping the record button 980 again. In other examples, the user can tap and hold the record button during the session, and release to stop recording. In the present embodiment, the recording captures a series of images that can be used to generate a multi-view digital media representation that can be for filtering either in real-time or after-the-fact.

In some implementations, applying a filter to a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object that is the subject of a multi-view video.

Figure 10:
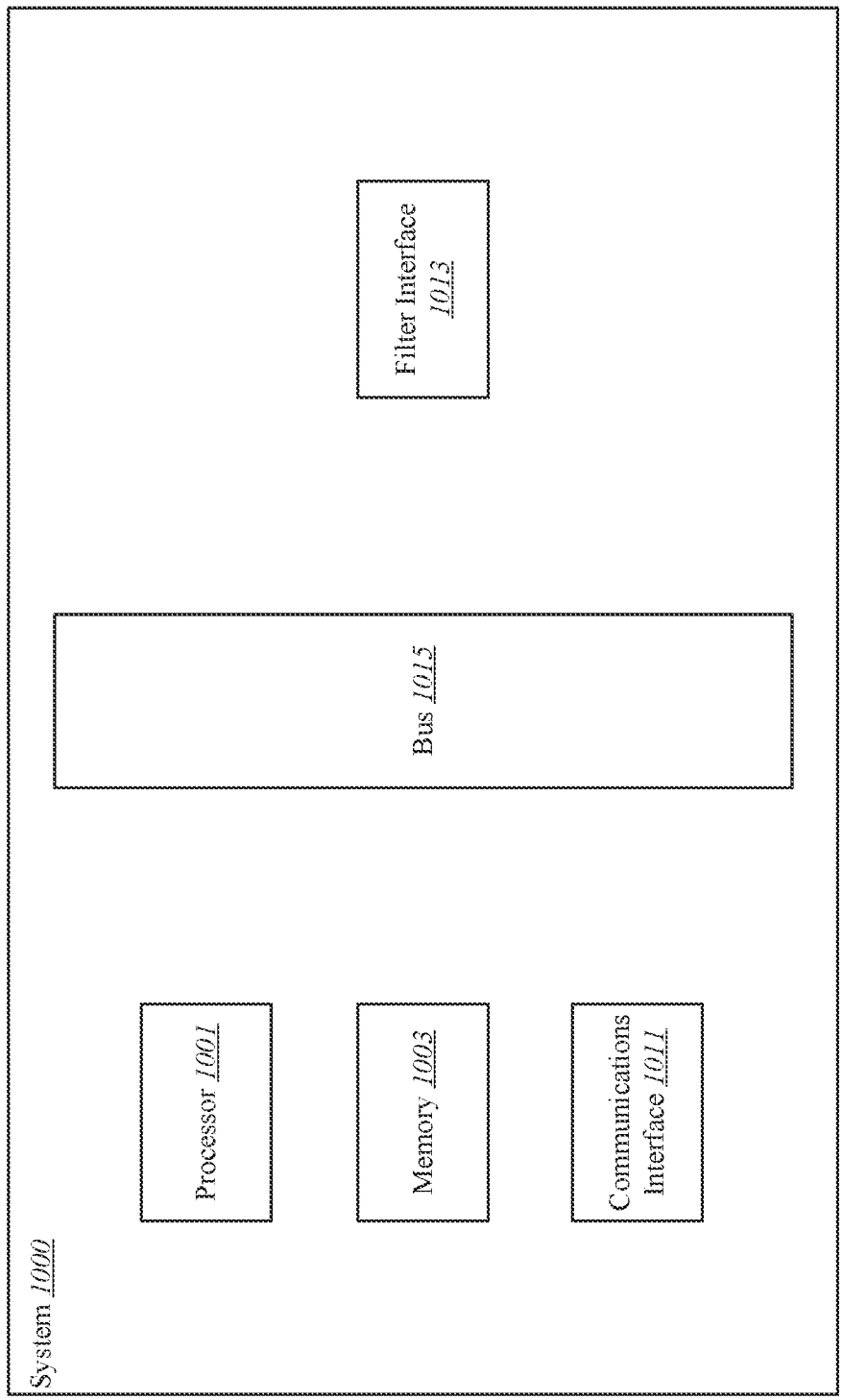
FIG. 10 illustrates a particular example of a computer system that can be used with various embodiments of the present invention.

With reference to FIG. 10, shown is a particular example of a computer system that can be used to implement particular examples of the present invention. For instance, the computer system 1000 can be used to apply one or more filters or effects to visual digital media content according to various embodiments described above. According to particular example embodiments, a system 1000 suitable for implementing particular embodiments of the present invention includes a processor 1001, a memory 1003, a communications interface 1011, a filter interface 1013, and a bus 1015 (e.g., a PCI bus). The filter interface 1013 may include separate input and output interfaces, or may be a unified interface supporting both operations. When acting under the control of appropriate software or firmware, the processor 1001 is responsible for such tasks such as optimization. Various specially configured devices can also be used in place of a processor 1001 or in addition to processor 1001. The complete implementation can also be done in custom hardware. The communications interface 1011 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

According to various embodiments, a potentially infinite variety of filters or modifications may be applied to digital media content. Although various examples have been describe elsewhere in this application, some additional examples are provided here to provide additional context. When a person is detected with arms outstretched, visual elements such as angel wings, bat wings, butterfly wings, plane wings and engines, or a jetpack with exhaust fumes may be added. When a person is detected in a leaning posture, visual elements such as a dinosaur tail, a squirrel tail, or a racoon tail may be added. When a person is detecting standing with hands on hips, visual elements may be added to replace the person's clothing with a superhero costume or to add a cape to the person's existing attire. When a person is detected as yelling, for instance with hands cupped around the mouth, visual elements may be added to depict a megaphone, flames, or a speech bubble near the person's mouth. Depending on a person's pose, visual elements may be added to replace a person's clothing or depict a person's body as a skeleton. When a person is detected as standing in a body builder's pose, the person's body may be replaced with one exhibiting more muscles or deformed to appear to exhibit more muscles. When a person is detected as having a hand over a mouth, visual elements may be added to make the person appear to be underwater as a scuba diver or mermaid. When a person is detect as leaning forward in a flying position, visual elements may be added to make the person appear to be a flying angel or super hero. For instance, a person's legs may be moved to make the person appear to be not supported by the ground. When a person is detected with arms uplifted, visual elements may be added to cause rainbows, money, or angels to appear over the person. When a person is detected with hands arranged in a boxing pose, visual elements may be added to make the person appear to be wearing boxing gloves or holding a weapon. A person's facial features or body may be modified to make the person appear to have the head or body of an animal, a fruit, a robot, or some other such object. A person's facial features may be detected and then used to select a corresponding emoticon, which then may be used to replace the person's head. When a person is detected as walking a dog, the dog's head and the person's head may be swapped. A person may be made to appear much thinner, heavier, more muscular, less muscular, or wavier than in reality. Motion blur may be added to make a person appear to be spinning very quickly. The preceding examples provide additional context about the types of visual modifications that could be made, but a potentially infinite variety of visual modifications may be provided according to various embodiments.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

What is claimed is:

1. A method comprising:
analyzing a surround view of a physical object, the surround view including both content and context information, wherein the surround view is viewable by a user from a plurality of different perspectives;
based on the content and/or context of the surround view determined by the processor, selecting a set of filters from a plurality of sets of filters, the set of filters including a visual digital media modification, wherein a first set of filters is selected if the surround view scene includes a person while a second set of filters is selected if the surround view scene includes a vehicle, wherein a motion blur filter is included in the second set of filters upon detecting the vehicle in the surround view, wherein the first set and the second set are different, wherein the visual digital media modification is configured to alter two or more viewpoints of the surround view; and
presenting the visual digital media modification as a selectable option by a user overlain in a live camera view.

2. The method of claim 1, wherein the surround view is a multi-view interactive digital media representation.

3. The method of claim 2, wherein the multi-view interactive digital media representation includes spatial information.

4. The method recited in claim 1, wherein the multi-view interactive digital media representation includes spatial information, scale information, and a plurality of different viewpoint images of the object.

5. The method recited in claim 1, wherein the characteristics include structure information indicating a physical context in which the physical object is positioned.

6. The method recited in claim 1, wherein the characteristics include pose information indicating an attitude or position associated with the physical object.

7. The method recited in claim 1, wherein the characteristics include movement information indicating a degree of velocity or acceleration of the object.

8. The method recited in claim 1, wherein the visual digital media modification includes a virtual object positioned within the visual digital media item.

9. The method recited in claim 1, wherein the visual digital media modification includes an artificial light source that appears to be blocked by the physical object in the visual digital media item.

10. The method recited in claim 1, wherein the visual digital media modification includes motion blur indicating movement associated with the object or a change to the color of a portion of the visual digital media item.

11. The method recited in claim 1, wherein the object is a human being, and wherein the visual digital media modification includes a text bubble appearing in proximity to a face.

12. The method recited in claim 1, the method further comprising:
receiving the visual digital media item at a server via a network from the mobile computing device, wherein providing the visual digital media modification for presentation in a user interface includes transmitting a message via the network to the client device.

13. The method recited in claim 1, wherein analyzing the visual digital media item comprises transmitting the visual digital media item to a server via a network from the mobile computing device and receiving a response message at the mobile computing device, the response message identifying the one or more characteristics.

14. The method recited in claim 1, wherein the visual digital media modification is automatically applied to the visual digital media item when it is determined that the visual digital media modification meets one or more designated criteria.

15. The method recited in claim 1, wherein the one or more designated criteria includes determining that the object is a person raising a hand.

16. A mobile computing device comprising:
a camera at the mobile computing device configured to capture image data;
an inertial measurement unit configured to capture inertial data;
a processor configured to:
analyze a surround view of a physical object, the surround view including both content and context information, wherein the surround view is viewable by a user from a plurality of different perspectives;
based on the content and/or context of the surround view determined by the processor, select a set of filters from a plurality of sets of filters, the set of filters including a visual digital media modification, wherein a first set of filters is selected if the surround view scene includes a person while a second set of filters is selected if the surround view scene includes a vehicle, wherein a motion blur filter is included in the second set of filters upon detecting the vehicle in the surround view, wherein the first set and the second set are different, wherein the visual digital media modification is configured to alter two or more viewpoints of the surround view; and
a display screen configured to present a user interface providing the visual digital media modification as a selectable option overlain in a live camera view.

17. The mobile computing device recited in claim 16, wherein the multi-view interactive digital media representation includes spatial information, scale information, and a plurality of different viewpoint images of the object.

18. The mobile computing device recited in claim 16, wherein identifying the object comprises transmitting the visual digital media item to a server via a network from the computing device and receiving a response message at the computing device, the response message identifying the one or more characteristics.

19. The mobile computing device recited in claim 16, wherein the characteristics include information selected from the group consisting of: structure information indicating a physical context in which the physical object is positioned, pose information indicating an attitude or position associated with the physical object, and movement information indicating a degree of velocity or acceleration of the object.

20. One or more non-transitory computer readable media having instructions stored thereon for performing a method, the method comprising:

analyzing a surround view of a physical object, the surround view including both content and context information, wherein the surround view is viewable by a user from a plurality of different perspectives;

based on the content and/or context of the surround view determined by the processor, selecting a set of filters from a plurality of sets of filters, the set of filters including a visual digital media modification, wherein a first set of filters is selected if the surround view scene includes a person while a second set of filters is selected if the surround view scene includes a vehicle, wherein a motion blur filter is included in the second set of filters upon detecting the vehicle in the surround view, wherein the first set and the second set are different, wherein the visual digital media modification is configured to alter two or more viewpoints of the surround view; and presenting the visual digital media modification as a selectable option by a user overlain in a live camera view.

* * * * *